(12) United States Patent
Katae et al.

(10) Patent No.: US 8,504,368 B2
(45) Date of Patent: Aug. 6, 2013

(54) SYNTHETIC SPEECH TEXT-INPUT DEVICE AND PROGRAM

(75) Inventors: Nobuyuki Katae, Kawasaki (JP); Kentaro Murase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 12/879,299

(22) Filed: Sep. 10, 2010

(65) Prior Publication Data

US 2011/0060590 A1   Mar. 10, 2011

(30) Foreign Application Priority Data

Sep. 10, 2009   (JP) ................................ 2009-209409

(51) Int. Cl.
*G10L 13/08* (2006.01)
(52) U.S. Cl.
USPC .......................................... 704/260; 704/258
(58) Field of Classification Search
USPC .................................................. 704/258–269
See application file for complete search history.

(56) References Cited

U.S. PATENT DOCUMENTS

| | | | | |
|---|---|---|---|---|
| 5,842,172 A * | 11/1998 | Wilson | ........................... | 704/503 |
| 6,226,614 B1 * | 5/2001 | Mizuno et al. | ................. | 704/260 |
| 6,661,418 B1 * | 12/2003 | McMillan et al. | ............ | 345/473 |
| 7,089,186 B2 * | 8/2006 | Fukada | .......................... | 704/258 |
| 7,249,022 B2 * | 7/2007 | Kayama et al. | ............... | 704/267 |
| 7,299,182 B2 * | 11/2007 | Xie | ................. | 704/258 |
| 7,512,322 B2 * | 3/2009 | Seo et al. | ....................... | 386/248 |
| 7,805,295 B2 * | 9/2010 | Gigi | .............. | 704/214 |
| 2001/0032080 A1 * | 10/2001 | Fukada | .......................... | 704/258 |
| 2003/0009336 A1 * | 1/2003 | Kenmochi et al. | ............. | 704/258 |
| 2003/0014253 A1 * | 1/2003 | Walsh | ............................. | 704/260 |
| 2006/0053017 A1 * | 3/2006 | Gigi | .............................. | 704/267 |
| 2006/0136214 A1 * | 6/2006 | Sato | .............................. | 704/265 |
| 2007/0244702 A1 * | 10/2007 | Kahn et al. | .................... | 704/260 |
| 2008/0312931 A1 * | 12/2008 | Mizutani et al. | .............. | 704/260 |
| 2008/0319755 A1 * | 12/2008 | Nishiike et al. | ............... | 704/267 |
| 2009/0006098 A1 | 1/2009 | Nishiike et al. | | |
| 2009/0018839 A1 * | 1/2009 | Cooper et al. | ................. | 704/260 |
| 2009/0076819 A1 * | 3/2009 | Wouters et al. | ............... | 704/260 |
| 2009/0132253 A1 * | 5/2009 | Bellegarda | ..................... | 704/258 |
| 2009/0306987 A1 * | 12/2009 | Nakano et al. | ................. | 704/260 |

FOREIGN PATENT DOCUMENTS

| | | |
|---|---|---|
| JP | 6-067685 A | 3/1994 |
| JP | 6-131148 A | 5/1994 |
| JP | 6-195094 A | 7/1994 |
| JP | 09-190437 | 7/1997 |

(Continued)

OTHER PUBLICATIONS

Japanese Office Action mailed Jun. 20, 2013 for corresponding Japanese Application No. 2009-209409.

*Primary Examiner* — Douglas Godbold
(74) *Attorney, Agent, or Firm* — Fujitsu Patent Center

(57) ABSTRACT

A synthetic speech text-input device is provided that allows a user to intuitively know an amount of an input text that can be fit in a desired duration. A synthetic speech text-input device 1 includes: an input unit that receives a set duration in which a speech to be synthesized is to be fit, and a text for a synthetic speech; a text amount calculation unit that calculates an acceptable text amount based on the set duration received by the input unit, the acceptable text amount being an amount of a text acceptable as a synthetic speech of the set duration; and a text amount output unit that outputs the acceptable text amount calculated by the text amount calculation unit, when the input unit receives the text.

10 Claims, 25 Drawing Sheets

FOREIGN PATENT DOCUMENTS

| | | |
|---|---|---|
| JP | 11-88828 | 3/1999 |
| JP | 11-308565 A | 11/1999 |
| JP | 2001-027996 A | 1/2001 |
| JP | 2003-216173 A | 7/2003 |
| JP | 2005-309173 A | 11/2005 |
| JP | 2009-008910 | 1/2009 |

* cited by examiner

Voice activity section

Silence section

SYNTHETIC SPEECH TEXT-INPUT DEVICE AND PROGRAM

CROSS-REFERENCE TO RELATED APPLICATION

This application is based upon and claims the benefit of priority of the prior Japanese Patent Application No. 2009-209409, filed on Sep. 10, 2009, the entire contents of which are incorporated herein by reference.

FIELD

The embodiments discussed herein are related to a synthetic speech text-input device and program with which a user enters a text as a base for a synthetic speech.

BACKGROUND

In video contents used in TV programs, etc., synthetic speeches has started taking the place of recorded speeches of narrators or voice actors, as speeches of narrations, speeches in animated cartoons and dubbed foreign pictures, etc.

In the production of video contents, a video editing operation called "post-production" is carried out, which is an operation for editing filmed video materials and recorded audio materials and compiling them into one work. This post-production is usually a non-linear editing operation using a computer at present. This editing operation is carried out by non-linearly adding, deleting, revising, and rearranging video materials and audio materials placed on a memory device such as a hard disk, using hardware controlled by software for video editing (hereinafter referred to as a "video editing system"). This enables efficient production of video contents. In such an editing operation using the video editing system, a producer has to arrange video and audio at a desired time position while synchronizing the video and the audio with each other. As a method, a device, and a program for synchronizing video and audio that can be used in the case where synthetic speeches are used as audio materials, there have been several known examples of those available (see, for example, Patent Documents 1 to 3).

Patent Document 1 discloses a speech synthesis controlling device capable of easily synchronizing a synthetic speech with a video signal at a predetermined display time. This speech synthesis controlling device controls the start of speech synthesis by obtaining, as a speech start timing, a speech start position in a text to be read aloud, and a speech start time, and outputting the speech start timing to the speech synthesis device.

Patent Document 2 discloses a synchronization control device for synchronizing synthetic speeches and videos such as computer graphics with each other. This is intended to generate prosodic data for controlling prosody of a synthetic speech based on input data containing text information and action designation information that designate a basic action of a video, and generating video control data containing action designation information and time information that associates time with an action designated by the action designation information, based on the input data and the prosodic data.

Patent Document 3 discloses an exemplary case where a synthetic speech is used indirectly, when audio materials are prepared with use of recorded speeches for video contents. In the method disclosed by Patent Document 3, text information of speech that is to be recorded is added to a video section in which the speech is to be input, whereby a synthetic speech is produced. After a duration, a pitch, intonation, a timbre, a timing of utterance, etc. of a synthetic speech are processed, the processed synthetic speech is reproduced toward a person who is to utter the speech, in order to display the timing for uttering the speech. The speech uttered by the person and the processed synthetic speech are compared as to the agreement therebetween, and whether the recorded speech is to be used or not is determined. A recorded speech that is determined to be used is combined with a video section.

[Patent Document 1] Japanese Laid-open Patent Publication No. 2005-309173

[Patent Document 2] Japanese Laid-open Patent Publication No. 2003-216173

[Patent Document 3] Japanese Laid-open Patent Publication No. 11 (1999)-308565

For example, when a synthetic speech is produced from an input text and is synchronized with a video in a video editing system, a user cannot intuitively know the duration of a speech to be synthesized, he/she sometimes gives too much or too little text to a desired speech duration. As a result, a speech synthesized from the text is sometimes too long or too short, and it is difficult to synchronize the speech with the video.

In Patent Document 1, a text for which a speech start position and a speech start time are set is prepared, so that the synchronization of the speech with a video is achieved. In this configuration, for example, if an excessively long text is described with respect to a time section interposed between one speech start position and a next speech start position, then a high-speed synthetic speech is prepared so that the speech of the text should be fit in this time section. Further, if a short text is described with respect to a time section, then a low-speed, spread speech, or an unnatural speech with many pauses, is prepared.

The synchronization control disclosed in Patent Document 2, in which a fixed-duration set of video data is prepared, cannot be adopted in the case where a speech that matches the duration has to be prepared.

According to the method disclosed in Patent Document 3, if a text to be synthesized is too short with respect to a video, only a slovenly spread speech is produced, whereas if a text to be synthesized is too short with respect to a video, it cannot be helped to produce a high-speech speech. As a result, only an unnatural speech is prepared.

Thus, a conventional technique does not have a mechanism for allowing a user to intuitively know a duration of a speech to be synthesized from an input text, which results in a problem of difficulty in synchronizing a video and a speech with each other. It should be noted that this problem occurs not only in the case where a video and a speech are synchronized, but also, for example, in the case where a user inputs a text for a synthetic speech corresponding to a desired duration.

SUMMARY

A synthetic speech text-input device disclosed in the present application includes: an input unit that receives a set duration of a synthetic speech and a text for a synthetic speech; a text amount calculation unit that calculates an acceptable text amount based on the set duration received by the input unit, the acceptable text amount being an amount of a text acceptable as a synthetic speech of the set duration; and a text amount output unit that outputs the acceptable text amount calculated by the text amount calculation unit, when the input unit receives the text.

The object and advantages of the invention will be realized and attained by means of the elements and combinations particularly pointed out in the claims. It is to be understood

DESCRIPTION OF EMBODIMENTS

Embodiment 1

Figure 1:
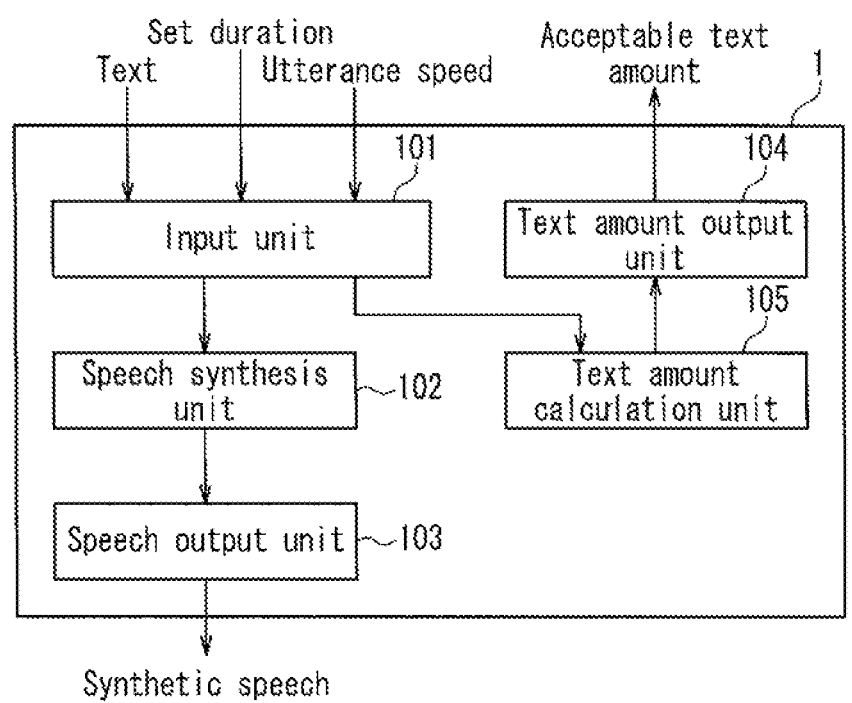
FIG. 1 is a functional block diagram illustrating an exemplary configuration of a synthetic speech text-input device according to Embodiment 1.

A synthetic speech text-input device according to the present embodiment, for example, is a device that a user uses when he/she enters a text to be read aloud. The synthetic speech text-input device includes an input unit, a text amount calculation unit, and a text amount output unit. The input unit receives input of a set duration of a synthetic speech and a text of a synthetic speech. The text amount calculation unit calculates an amount of a text acceptable as a synthetic speech of the set duration ("acceptable . . . " herein means for example " . . . that can be input"), on the basis of the set duration of the synthetic speech input via the input unit. The text amount output unit outputs the text amount calculated by the text amount calculation unit, when the input unit receives the text of the synthetic speech.

Here, a set duration of a synthetic speech is a duration of time in which a synthetic speech obtained by synthesis based on the input text should be fit, and it is, for example, a time designated by a user. In the above-described configuration, an acceptable text amount calculated from the set duration by the text calculation unit is output when the text-input of the synthetic speech is received. Therefore, a user who enters a text of a synthetic speech is allowed to know an acceptable text amount corresponding to a set duration.

In the present embodiment, the input unit may further receive input of an utterance speed of a synthetic speech, and the text amount calculation unit may calculate an amount of a text acceptable as a synthetic speech of the set duration, using the utterance speed received by the input unit. This configuration allows the user to know an acceptable text amount with the utterance speed being taken into consideration.

The text amount calculation unit may, for example, calculate an text amount corresponding to a set duration, using a value indicative of a text amount per unit time or a value indicative of a time per unit text. Further, a value indicative of a ratio of a speech section or a pause section per set duration may be used further in the above-described calculation. These values used in the calculation may be recorded preliminarily, or may be determined on the basis of information received by the input unit (e.g., utterance speed). The style for expressing a text amount is not limited particularly, and a text amount may be expressed in the form of, for example, the number of characters, the number of words, the length of a character string or a sentence. When a text in a form including a kanji character (Chinese character) and the like is input and a reading of text is long when it is read aloud, the time of speech synthesis extends. Therefore, an utterance amount of the speech may be used as a text amount. Besides, a text amount may be calculated as an amount including a silence section such as a period corresponding to a punctuation mark.

When receiving text-input of a synthetic speech by a user, the text amount output unit outputs an acceptable text amount corresponding to a set duration in such a manner that the user can recognize the acceptable text amount. The style of output is not limited particularly. For example, the acceptable text amount may be informed to a user by varying a size of a text-input region for a synthetic speech that is displayed on a display screen.

[Exemplary Configuration of Device]

FIG. 1 is a functional block diagram illustrating an exemplary configuration of a synthetic speech text-input device according to the present embodiment. A synthetic speech text-input device 1 illustrated in FIG. 1 includes an input unit 101, a speech synthesis unit 102, a speech output unit 103, a text amount output unit 104, and a text amount calculation unit 105. The synthesis speech text-input device 1 is formed of, for example, a computer including a processor and a memory. To the computer, input devices such as a keyboard and a mouse, and output devices such as a display, speakers, and a printer are connected. Each of the input unit 101, the speech synthesis unit 102, the speech output unit 103, the text amount output unit 104, and the text amount calculation unit 105 is a functional unit embodied by the processor of the computer that executes process based on a predetermined program stored in a memory.

The synthetic speech text-input device 1 can be used, for example, as a device with which a user enters a text that is converted into a synthetic speech and is added (inserted) in synchronization with video data in a video editing system. The present embodiment is explained with reference to a case, as an example, where the synthetic speech text-input device 1 is used for inputting a text for a synthetic speech to be added to a designated section in video data.

The input unit 101 receives (accepts) data input from a user via an input device and a GUI. In the present embodiment, the information received from a user includes a text, a set duration, and an utterance speed. When receiving input of a set duration, the input unit 101 may receive designation of a section of at least a part of video data from a user, and may set a duration corresponding to the designated section as the set duration. This allows the user to enter a set duration of a synthetic speech by designating a section of video data. It should be noted that the manner of inputting a set duration is not limited to this, and, for example, input of a numerical value indicative of a set duration may be received from a user.

Using a set duration and an utterance speed received by the input unit 101, the text amount calculation unit 105 calculates an amount of a text acceptable as a synthetic speech of the aforementioned set duration. Here, the text amount is on the premise of the normal speech output speed. The text amount calculation unit 105 can calculate the number of characters corresponding to the given speech duration, for example, based on a ratio of voice activity sections or pause sections in a speech, and the number of syllables or the number of moras per character, as well as the set duration and the utterance speed received by the input unit 101.

Here, an example of a syllable is an audio unit composed of one vowel and one or more consonants. In the case of the Japanese language, the definition of the syllable is not always clear. For example, the word "Kantoh (関東)" is considered to have two syllables, that is, "Kan" and "toh" in some cases, and is considered to have four syllables, that is, "Ka", "n", "to", and "oh" in other cases. On the other hand, the "mora" is a unit that composes a rhythm in a language such as the Japanese language, and in the Japanese language, one character of hiragana (Japanese phonetic alphabet) corresponds to one mora. (However, in the case of a two-character expression with a diphthong (a small-sized Japanese kana character, such as "ya", "yu", and "yo" in "kya", "kyu", and "kyo", which are expressed in Roman characters for convenience of description), such two characters in combination correspond to one mora.) The word "Kantoh" is composed of four moras, i.e., "Ka", "n", "to", and "oh". The present embodiment is explained with reference to a case where the moras are used in the calculation by the text amount calculation unit 105.

The text amount output unit 104 outputs an acceptable text amount calculated by the text amount calculation unit 105, so as to allow a user to recognize the acceptable text amount. For example, a text box in a size corresponding to the acceptable number of characters calculated by the text amount calculation unit 105 may be displayed on the display screen, whereby a user is allowed to intuitively know the number of characters of an input text that can be fit in a set duration. This makes it possible for the user to set a text with the suitable number of characters.

The speech synthesis unit 102 converts, into a synthetic speech, the text for a synthetic speech that has been input via the input unit 101. More specifically, the speech synthesis unit 102 synthesizes a speech waveform signal, based on the text input via the input unit 101. For a function for generating a speech waveform signal from a text, a known technique can be used, such as the waveform concatenation method (the corpus-base method), the LPC method, the PARCOR method, or the LSP method. The speech output unit 103 outputs, to speakers, etc., the synthetic speech generated by the speech synthesis unit 102.

The synthetic speech text-input device 1 illustrated in FIG. 1 is intended to predict the number of characters of a text that can be input (the acceptable number of characters), on the basis of a set duration and an utterance speed set by a user, and present it to a user, to invite the user to input a text in accordance with the number of characters. It should be noted that if the synthetic speech text-input device 1 is used in a video editing system, the utterance speed is often constant through one set of contents, and therefore it is possible to use a preliminarily set utterance speed value. In other words, as the utterance speed, a value received by the input unit 101 may be used, or a preliminarily set value may be used.

[Exemplary Operation]

Figure 2:
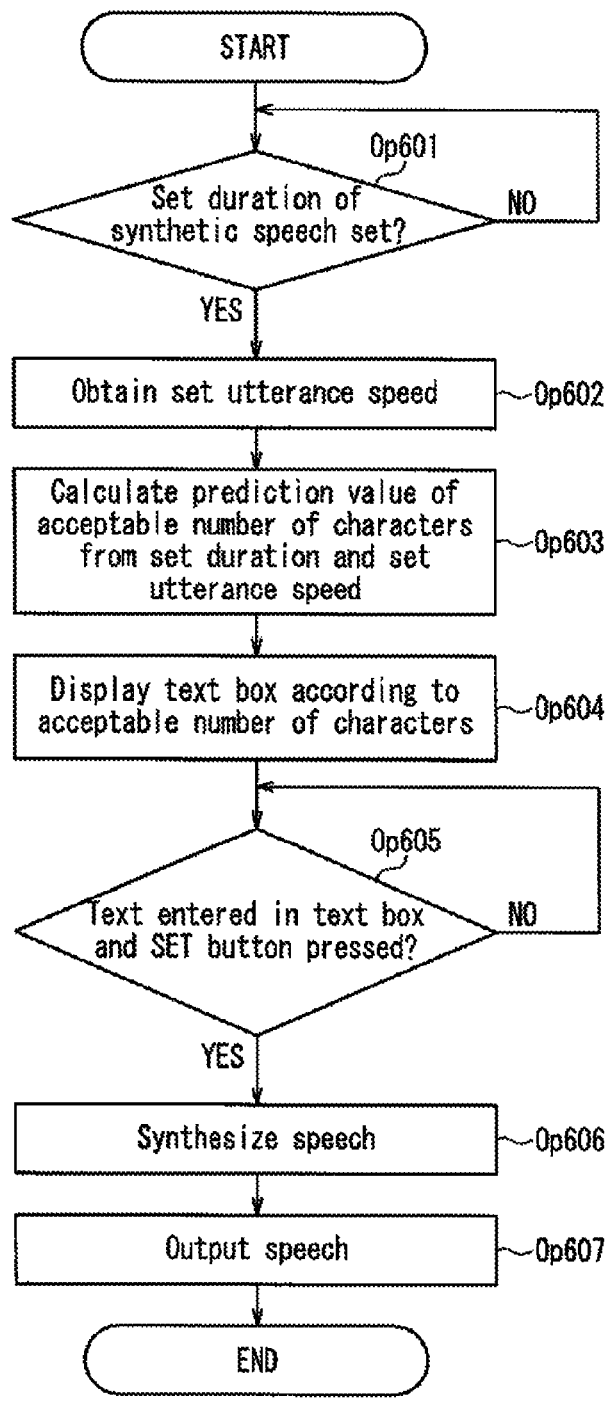
FIG. 2 is a flowchart illustrating an exemplary operation of the synthetic speech text-input device according to Embodiment 1.

FIG. 2 is a flowchart illustrating an exemplary operation of the synthetic speech text-input device 1 according to Embodiment 1. In the example illustrated in FIG. 2, first, when a set duration is input to the input unit 101 (Op601: Yes), the input unit 101 obtains an utterance speed (Op602).

The text amount calculation unit 105 predicts, by calculation, a value of the number of characters that can be synthesized (the acceptable number of characters) based on the set duration and the utterance speed (Op603). The utterance speed is represented with the number of moras per unit time, for example, n mora/sec. Explained herein is a case where the text amount calculation unit 105 calculates the acceptable number of characters, using a value indicative of a proportion of voice activity sections in a synthetic speech, and the number of moras per character. Generally, a ratio between voice activity sections (speech sections) and silence sections (pause sections) in an entire speech can be derived from a speech database and the like statistically. For example, a ratio r of voice activity sections in an entire speech that was determined statistically can be stored preliminarily. Further, an average mora number per character of a text that includes all types of characters such as kanji, hiragana, katakana (another Japanese phonetic alphabet), signs, and alphabets can be determined statistically and set preliminarily. Here, the average mora number per character of a text is assumed to be m. If the set duration is assumed to be D, a prediction value of the acceptable number of characters can be calculated by, for example, the formula (1) below:

$$\text{Acceptable number of characters(predicted)} = D \times r \times n / m \quad (1)$$

Thus, in the above-described example, values for converting a set duration into a text amount, such as the average number of moras per character, which is m, and the ratio of voice activity sections, which is r, as well as the set duration and the utterance speed received by the input unit 101, are substituted into the predetermined formula, whereby an acceptable text amount is calculated. It should be noted that the values and the calculation formula for converting a set duration into a text amount are not limited to those in the aforementioned example.

The text amount output unit 104 presents to a user the acceptable number of characters that has been determined as described above. For example, the unit displays a text box corresponding to the acceptable number of characters in the screen (Op604). Thus, a display that enables intuitive understanding is provided. When it is detected that in the input unit 101 a user enters a text into a text box and presses a SET button (ENTER key) (Op605: Yes), the speech synthesis unit 102 synthesizes a speech corresponding to the text at the utterance speed (Op606), and the speech output unit 103 outputs the synthesized speech (Op607).

[Exemplary Screen Transition]

FIGS. 3A to 3D are diagrams illustrating exemplary screen transition displayed on a display in the exemplary operation illustrated in FIG. 2. In the screen illustrated in FIG. 3A, thumbnail images T1 of video data are arranged in an upper part of the screen. These thumbnail images T1 are freeze-frame pictures that are cut from video data at constant time intervals, scaled down, and arranged in time order. A user can look though entire video data by scrolling the thumbnail images T1. When the user finds in the video data a section to which he/she wishes to add a synthetic speech, he/she designate the section as a section to which a synthetic speech is to be added (inserted) (synthetic speech-addition section), by using a pointing device such as a mouse. The speech-addition section is displayed as a rectangular frame K1, and a width of the rectangular frame K1 represents a set duration.

Figure 3A:
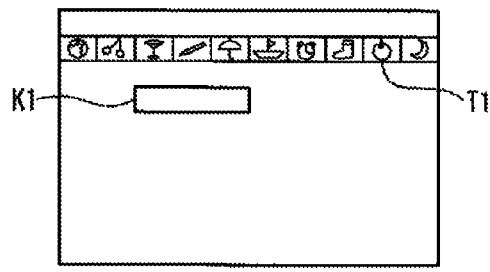
FIGS. 3A to 3D are diagrams illustrating exemplary screen transition displayed on a display in the exemplary operation illustrated in FIG. 2.
Figure 3B:
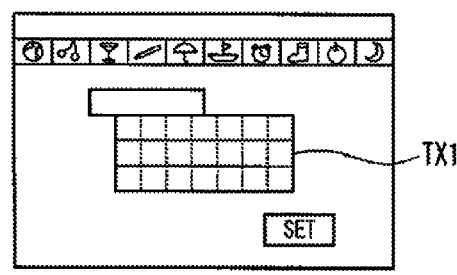

When a synthetic speech-addition section is designated, the acceptable number of characters is calculated by the text amount calculation unit 105 as described above, according to the set duration of the synthetic speech-addition section. For example, as illustrated in FIG. 3B, a text box TX1 having squares corresponding to the calculated number of characters is displayed (Op604 in FIG. 2). In other words, a text-input region in a size corresponding to the set duration is displayed.

Figure 3C:
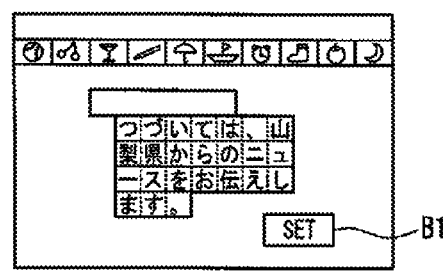
Figure 3D:
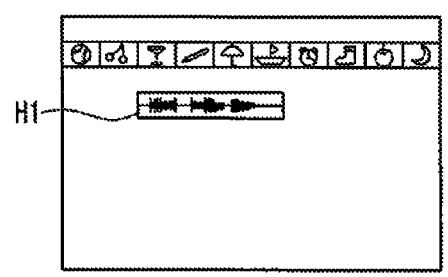

The user inputs a text in the text box TX1, and when completing the input of the entire text, he/she presses (clicks) the SET button B1 (see FIG. 3C). When the SET button B1 is pressed (Op605 in FIG. 2: Yes), a synthetic speech of the text entered in the text box TX1 is generated, and is recorded as speech data, in a state of corresponding to the video data. In other words, the synthetic speech is stored in synchronization with the video data. On the screen illustrated in FIG. 3D, a speech waveform H1 of the generated synthetic speech is displayed. It should be noted that it is possible to provide a function as follows: when the user clicks a rectangular frame surrounding the speech wavelength H1, he/she goes back to the screen illustrated in FIG. 3C and can change the text.

[Example in Case of English Language]

Since in the Japanese language it is usual to express the length of a text with the number of characters, the above-described synthetic speech text-input device 1 predicts the acceptable number of characters in accordance with a set duration, and displays a text box in accordance with the number of characters on the screen. In the case of the English language, a text amount (length) is expressed with the number of words generally. Therefore, it is preferable to display a text box having a width suitable for writing the number of words in accordance with a set duration.

In the case of the English language, the utterance speed is expressed with, for example, the number of words per minute (word per minute: WPS). The utterance speed at which a speech read aloud is easy to listen to is 150 to 160 words/min, and a speech in a TV news program or the like is faster than that, at about 200 words/min or more. In the present embodiment, when the synthetic speech text-input device 1 receives input of a set duration of a synthetic speech to be added to a video in synchronization with the video, for example, the number of words corresponding to the given set duration can be calculated from an utterance speed, and a ratio of speech sections or pause sections in the speech. Further, it is possible to present to a user a text box in a size in accordance with the speech duration, by using the number of characters per word and the font size.

Here, an exemplary text amount calculation by the text amount calculation unit 105 in the case where a synthetic speech is in English is explained below. Here, the utterance speed is set with, for example, WPS, like n words/min. A ratio of voice activity sections in an entire speech, which is r, an average number of characters per word, which is m, and an average font width per character, which is w, are recorded in the synthetic speech text-input device 1 preliminarily. If the set duration is assumed to be D minutes, an acceptable text length can be calculated using, for example, the formula (2) below:

$$\text{Acceptable text length(predicted value)} = D \times r \times n \times m \times w \quad (2)$$

For example, if the utterance speed is assumed to be 200 words/min, the ratio r of voice activity sections in an entire speech is 0.7, the average number m of characters per word is 8, and the average font width w per character is 1.5 mm, and when the set duration is 30 seconds (=0.5 minute), then an acceptable text length is 0.5×0.7×200×8×1.5=840 mm. If each row of a text box is assumed to have a length of 100 mm, a text box of 8.4 lines is to be displayed.

Thus, the language dealt with by the synthetic speech text-input device 1 is not limited particularly. Even in the case of a language other than the Japanese and English languages, it is possible to adopt a text amount calculation method and a display method that are suitable for the own features and characters of the language.

As described above, according to the present embodiment, an amount of an input text suitable for a set duration desired by a user is presented to the user when the user enters a text, in such a manner that the user can intuitively understand. Therefore, the user is allowed to set an appropriate amount of a text. Consequently, the user can easily produce, for example, a synthetic speech in synchronization with a video.

Embodiment 2

Figure 4:
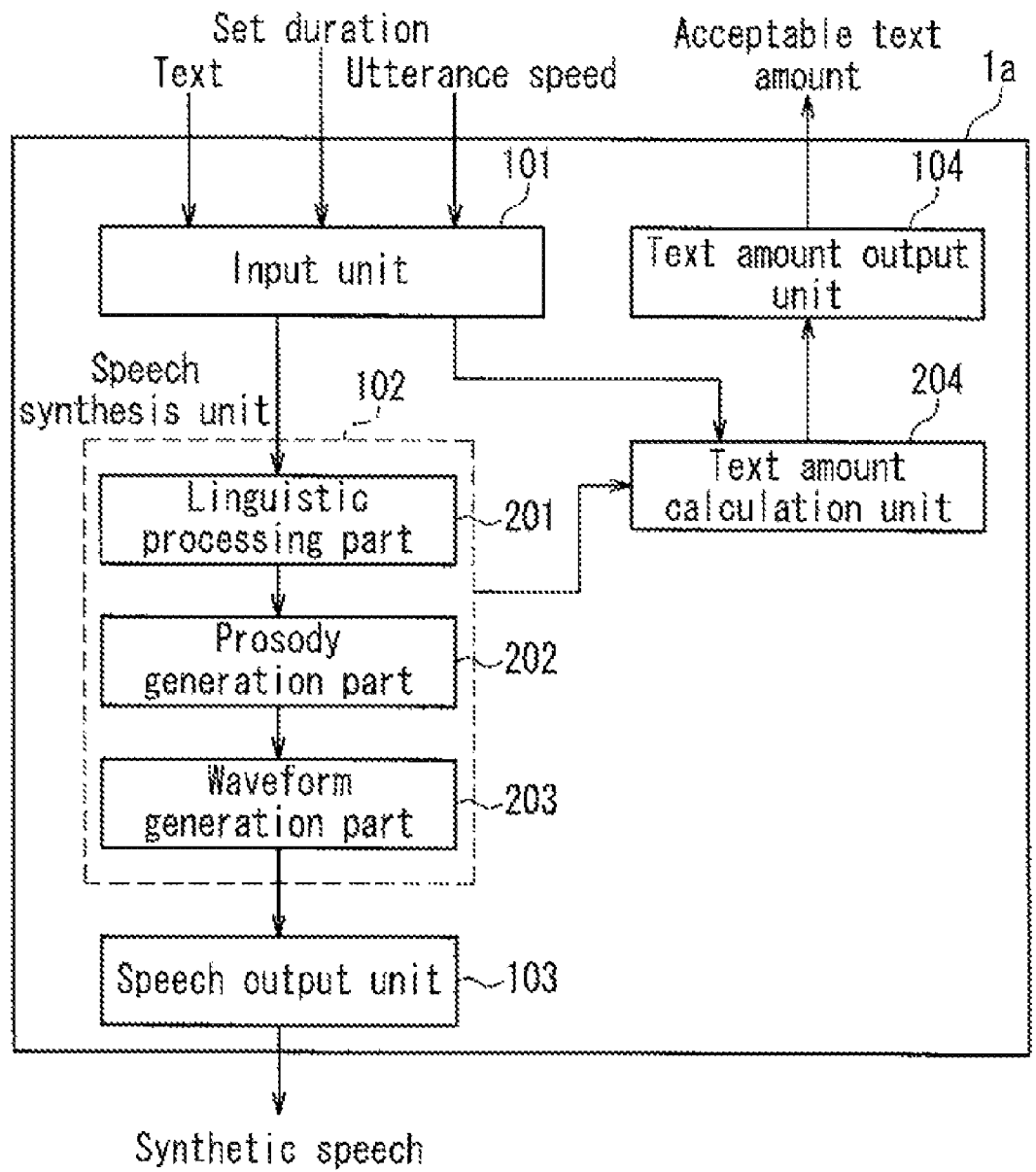
FIG. 4 is a functional block diagram illustrating an exemplary configuration of a synthetic speech text-input device according to Embodiment 2.

FIG. 4 is a functional block diagram illustrating an exemplary configuration of a synthetic speech text-input device 1a according to Embodiment 2. In the synthetic speech text-input device 1a, a speech synthesis unit 102 includes a linguistic processing part 201, a prosody generation part 202, and a waveform generation part 203. The linguistic processing part 201 analyzes a text of a synthetic speech input via the input unit 101, and generates an intermediate expression that includes reading information of the text. The prosody generation part 202 generates a duration of a synthetic speech corresponding to the text, and a pitch pattern as a variation pattern of a pitch of the synthetic speech corresponding to the text, from the intermediate expression generated by the linguistic processing part 201. The waveform generation part 203 generates a synthetic speech, based on the duration of the synthetic speech corresponding to the text, and the pitch pattern as a variation pattern of a pitch of the synthetic speech corresponding to the text, which have been generated by the prosody generation part 202. A text amount calculation unit 204 calculates an amount of a text acceptable as a synthetic speech of the set duration, again using the duration of the synthetic speech calculated by the prosody generation part 202 of the speech synthesis unit.

In the above-described configuration, an acceptable text amount is calculated, using the duration of the synthetic speech of the text already input via the input unit 101. Therefore, regarding the text already input, an actual duration is calculated, and an acceptable text amount is adjusted, using this duration. As a result, a user is allowed to know the acceptable text amount in accordance with a text input state.

[Exemplary Operation]

Figure 5:
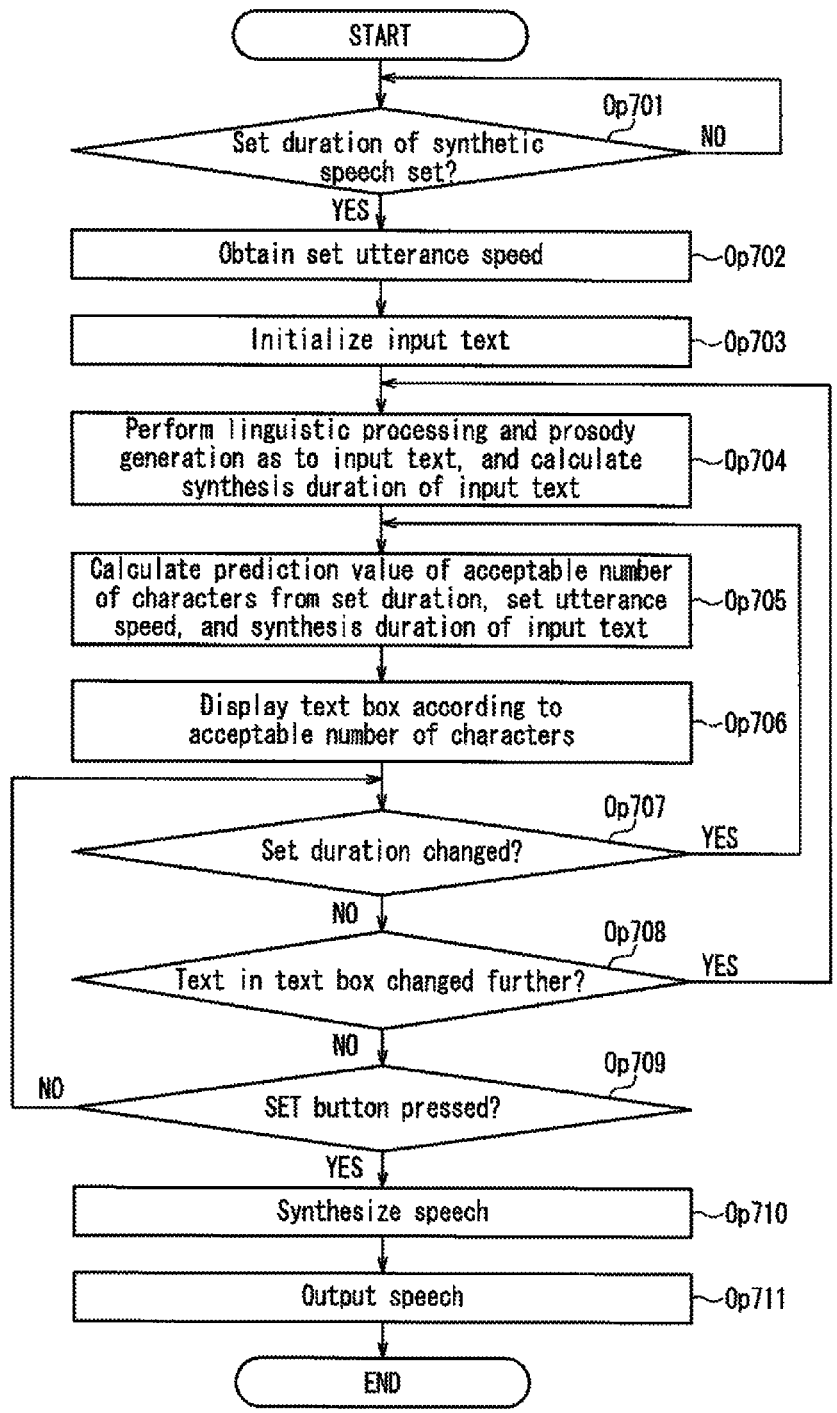
FIG. 5 is a flowchart illustrating an exemplary operation of the synthetic speech text-input device according to Embodiment 2.

FIG. 5 is a flowchart illustrating an exemplary operation of the synthetic speech text-input device 1a according to Embodiment 2. In the example illustrated in FIG. 5, first, when the input unit 101 receives entry of a set duration by a user (Op701: Yes), the input unit 101 obtains an utterance speed (Op702), and initializes the input text (Op703). The linguistic processing part 201 of the speech synthesis unit 102 performs linguistic processing such as morpheme analysis and syntactic analysis of a text that has been input already (already input text), and generates a phonogram string with respect to the text. The phonogram string is a character string that expresses a reading of a text, which includes information that indicates, for example, the manner in which the text is read aloud, accents, how boundaries of phrases and pauses are provided, etc. A phonogram string is an example of intermediate expression in the speech synthesis.

The prosody generation part 202 calculates a duration of each mora, or each of phonemes composing each mora, based on the phonogram string, and generates a pitch pattern as a variation pattern of a pitch of voice. At this stage, however, in order to calculate a text amount, a duration is necessary while a pitch pattern is unnecessary. Therefore, only duration may be determined. Here, summing the calculated respective durations of the moras or the phonemes, the prosody generation part 202 can determine a synthesis duration (duration of a synthetic speech) corresponding to the already input text (Op704). It should be noted that in an initial state, no text is input, and hence, a synthesis duration is 0. The text amount calculation unit 204 predicts, by calculation, a value of the number of characters, from a set duration, an utterance speed, and a sum duration of an already input text (Op705). Here, as in Embodiment 1 described above, if the utterance speed is assumed to be n mora/sec, the ratio of voice activity section in an entire speech is assumed to be r, the average number of moras per character in the text is assumed to be m, the set speech duration is assumed to be D seconds, the number of characters of an already input text is assumed to be k, and the sum duration thereof is assumed to be "t", then the prediction value of the acceptable number of characters may be calculated by, for example, the formula (3) below:

$$\text{Acceptable number of characters(predicted)} = k + (D-t) \times r \times n/m \quad (3)$$

The text amount output unit 104 presents to a user the acceptable number of characters that has been determined as described above, by a method such as display of a text box in accordance with the acceptable number of characters (Op706). If the set duration is changed by, for example, an instruction from a user, in the input unit 101 (Op707: Yes), then, the flow returns to Op705, and the text amount calculation unit 204 again predicts, by re-calculation, a value of the acceptable number of characters, as to the changed set duration. The text amount output unit 104 presents to the user the acceptable number of characters thus re-calculated. Further, in the case where the input text is changed additionally (Op708: Yes), the flow returns to Op704, and a sum duration as to the additionally changed text is determined by the linguistic processing part 201 and the prosody generation part 202. Thereafter, the text amount calculation unit 204 re-calculates the acceptable number of characters (Op705), and the text amount output unit 104 re-presents the same to the user (Op706). The series of operations described above is repeated until the user fixes the text (Op709: Yes). Once the text is fixed, the waveform generation part 203 synthesizes a speech of the text (Op710), and the speech output unit 103 outputs the synthesized speech (Op711).

Through the above-described process, as to the already input text, an actual duration of a synthesized speech is calculated at any time, and the acceptable number of characters is corrected at any time and presented to a user. Therefore, the user is allowed to adjust the input text so that it matches the duration of the speech that is to be synthesized finally.

The calculation of the text amount by the text amount calculation unit 204, however, is not limited to the method using the formula (3) above. For example, in an initial state where no text has been input, the text amount calculation unit 204 may calculate an initial value of the acceptable number of text characters in the same manner as that in Embodiment 1. When a text is input, calculation can be carried out by using, as the acceptable number of text characters, the number of characters corresponding to a duration obtained by subtracting a duration corresponding to the number of moras of the input text from the set duration.

Thus, the speech synthesis unit 102 calculates a duration of a partial synthetic speech corresponding to a portion of a text received by the input unit 101, as a synthetic speech of a set duration, and the text amount calculation unit 204 can correct an amount of a text acceptable as a synthetic speech of the set duration, using the partial synthetic speech duration calculated by the speech synthesis unit 102. This makes it possible to correct the acceptable text amount at any time in accordance with a text entered by a user, and to present a more accurate acceptable text amount to the user.

[Exemplary Screen Transition]

FIGS. 6A to 6F are diagrams illustrating exemplary screen transition displayed on a display in the exemplary operation illustrated in FIG. 5. In the screen illustrated in FIG. 6A, thumbnail images T1 of video data are arranged in an upper part of the screen. A section in the video data designated by a user as a section to which he/she wishes to add a synthetic speech, that is, a speech-addition section, is displayed as a rectangular frame K1, and a width of the rectangular frame K1 represents a set duration.

Figure 6A:
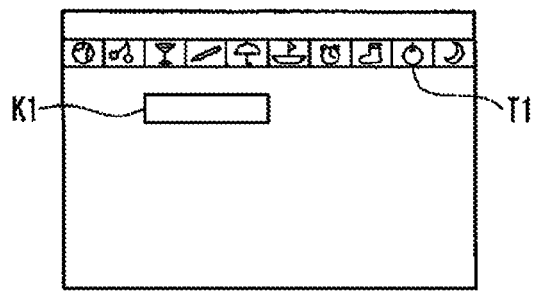
FIGS. 6A to 6F are diagrams illustrating exemplary screen transition displayed on a display in the exemplary operation illustrated in FIG. 5.
Figure 6B:
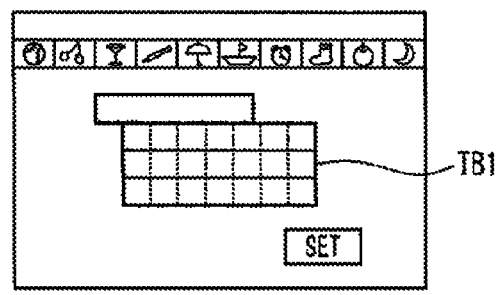

When the speech-addition section is set, the acceptable number of characters is calculated in accordance with the set duration of the speech-addition section, and a text box TB1 having the same number of squares is displayed (see FIG. 6B).

Figure 6C:
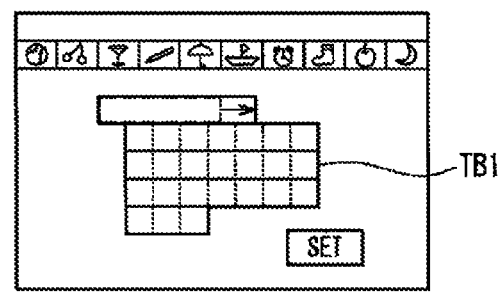
Figure 6D:
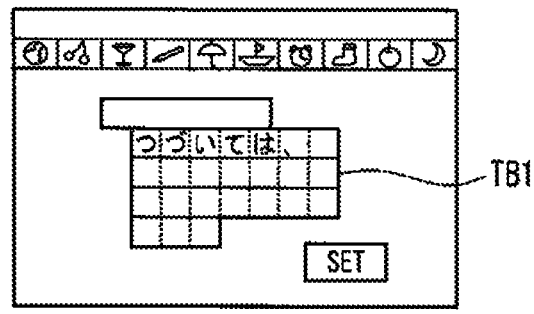

As illustrated in FIG. 6C, a user is allowed to change the length of the speech-addition section by spreading the rectangular frame K1 in the width direction with use of a mouse, etc. When the speech-addition section is changed, the set duration changes also. Therefore, as to the set duration thus changed, the acceptable number of characters is re-calculated, which causes the number of squares of the text box TB1 to change (this corresponds to the process in the case of Yes at Op707 in FIG. 5). In other words, if the speech-addition section is changed, the size of the text box TB1 changes. As illustrated in FIG. 6D, when the user enters a text in the text box, the acceptable number of characters is re-calculated at any time, and accordingly the number of squares in the text box changes (this corresponds to the process in the case of Yes at Op708 in FIG. 5). It should be noted that the timings of re-calculation of the acceptable number of characters are not limited to those depicted in FIG. 5. The re-calculation may be carried out at various timings including, for example, when a predetermined certain number of characters have been input, or when a predetermined time period has passed.

Figure 6E:
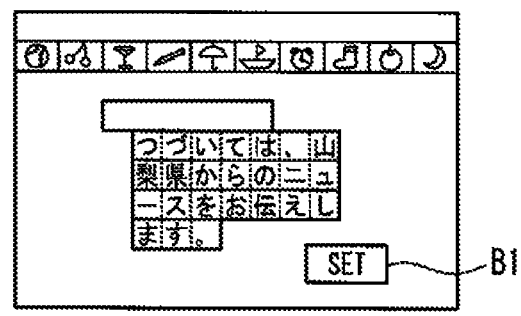
Figure 6F:
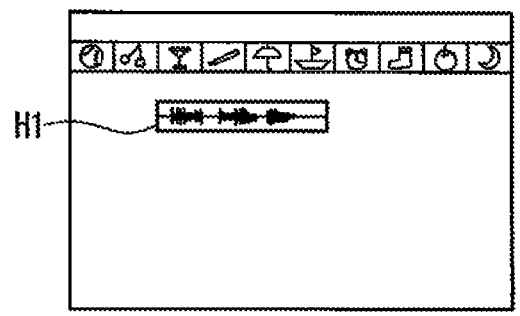

The user completes the entry of the entire text, and presses the SET button B1 (see FIG. 6E). When the SET button is pressed (Op709 in FIG. 5: Yes), a synthetic speech of the input text is produced, and is recorded in synchronization with the video data. As illustrated in FIG. 6F, a speech waveform H1 may be displayed on the screen. It is possible to provide a function as follows: when the user clicks a rectangular frame surrounding the speech wavelength H1, he/she goes back to the screen illustrated in FIG. 6E and can change the text.

As illustrated in the above-described exemplary screen transition, in the present embodiment, the acceptable number of text characters is re-calculated in accordance with the a text entered by a user, and is updated. This makes it possible to present to present a more accurate acceptable text amount to a user.

Here, the above-described effect is explained in more detail. The acceptable text amount calculated by the text amount calculation unit 204 is a calculated value, which in some cases may be different from an amount of a text that can be input actually. For example, in the case where a user enters a text having the acceptable number of characters that the text amount calculation section has calculated based on a set duration and an utterance speed, a difference occurs in some cases between the set duration and a duration of a speech synthesized actually from the text, depending on the input text. The text amount calculation section uses the statistically determined ratio of voice activity sections in the calculation of the acceptable number of characters as described above, but this ratio is different from an actually synthesized speech in some cases. For example, if there are many punctuation marks in a text, there are many pauses (silence sections) in a synthetic speech of the text. Further, when a case where a text is a normal sentence and a case where a text is a list of itemized matters are compared, the text in the latter case tends to include more pauses. Thus, depending on the text style, a ratio of voice activity sections in a synthetic speech is different from the statistic value in some cases. Still further, regarding the average number of moras per character, which is used in the prediction of the acceptable number of characters, a text having many Chinese characters and a text having many hiragana characters, even though they have the same number of characters, result in that synthetic speeches thereof have different durations, since generally one Chinese character has one to several moras while one hiragana character has one mora or less (as described above, basically one hiragana character corresponds one mora, but in the case of two-character expression with a diphthong, such two characters in combination correspond to one mora.). Then, in the present embodiment, while a user is entering a text, an actual duration of a synthetic speech of a text already input is calculated at any time, and the acceptable number of characters is corrected at any time, whereby the predicted value can be made to approach the actual value. In other words, in accordance with a text entered by a user, the difference between a set duration and a duration of a speech actually synthesized can be decreased. For example, this allows a user to adjust an input text while entering the text so that the text matches the duration of a speech to be finally synthesized.

[Example in Case of English Language]

In the case of the English language as well, like the case of the Japanese language, the statistically determined ratio of voice activity sections can be used in the prediction of an acceptable text length. However, for example, if there are many commas and periods in a text, a synthetic speech obtained includes many pauses (silence sections). Further, when a case where a text is a normal sentence and a case where a text is a list of itemized matters are compared, the text in the latter case includes more pauses. Thus, depending on the text style, a ratio of voice activity sections in a synthetic speech is different from the statistic value in some cases. Still further, there is not necessarily a complete correspondence between the number of characters in a spelling of a word and a duration of a pronunciation of the same word. For example, there are words that have different numbers of characters, respectively, though having the same pronunciation, thereby having the same duration, like "wait" and "weight", which have four and six characters, respectively, though having the same pronunciation and duration. In other words, even with the same speech duration, a synthesis-used text length is short in some cases, or is long in other cases, depending on words composing the text. Therefore, in the case where a synthetic speech is in English as well, while a user is entering a text, an actual duration of a synthetic speech of a text already input is calculated at any time, and the acceptable text length is corrected at any time and displayed, whereby the user is allowed to adjust an input text so that the text matches the duration of a speech to be finally synthesized.

For example, if the utterance speed is assumed to be n words/min, the ratio of voice activity section in an entire speech is assumed to be r, the average number of characters per word is assumed to be m, the average font width per character is assumed to be w, the set speech duration is assumed to be D minutes, the text length of an already input text is assumed to be k, and the synthesis duration thereof is assumed to be t, the acceptable text length may be calculated by, for example, the formula (4) below:

$$\text{Acceptable text length(predicted)} = k + (D-t) \times r \times n \times m \times w \quad (4)$$

Thus, even if the language of a synthetic speech and a text is English or still another language, it is possible to calculate an acceptable text amount in the same manner, by using the duration of an already input text calculated by the speech synthesis unit 102.

[Exemplary Screen Transition in Case of English Language]

Figure 7A:
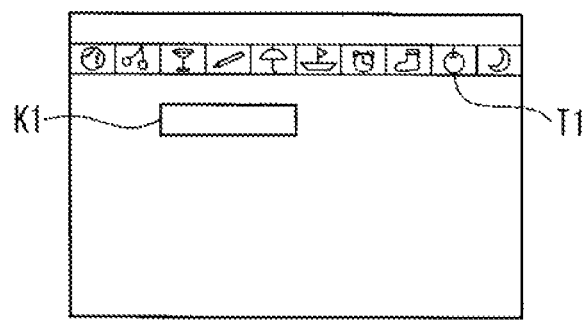
FIGS. 7A to 7F are diagrams illustrating exemplary screen transition displayed on a display in the case of the English language.

FIGS. 7A to 7F are diagrams illustrating exemplary screen transition displayed on a display in the case where a synthetic speech and an input text are in English. In FIG. 7A, as in FIG. 6A, thumbnail images T1 and a rectangular frame K1 indicating a speech-addition section are displayed. The width of the rectangular frame K1 indicates a set duration.

Figure 7B:
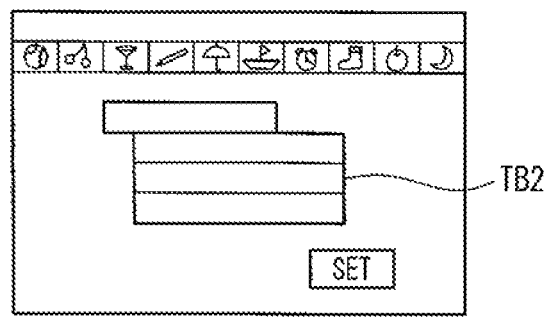

Once a speech-addition section is set, an acceptable text length is calculated based on the set duration of the speech-addition section, and a text box TB2 having a width corresponding to the text length is displayed (see FIG. 7B).

Figure 7C:
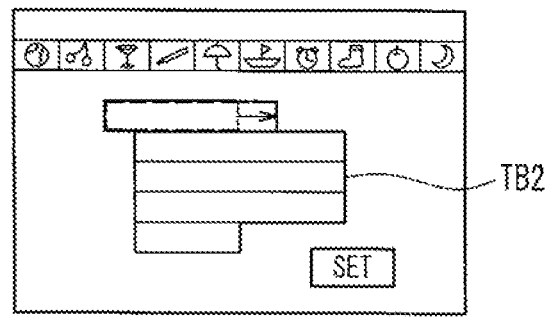
Figure 7D:
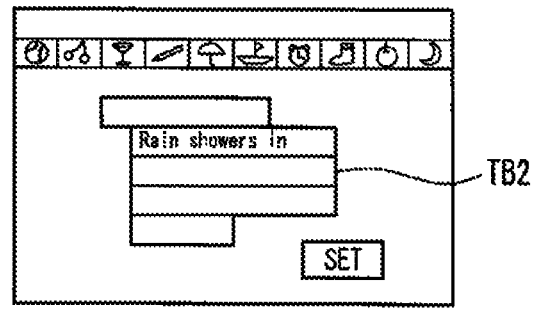
Figure 7E:
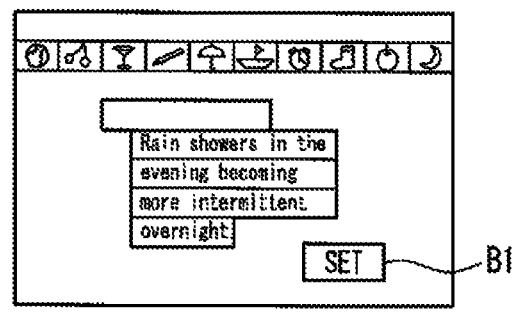

As illustrated in FIG. 7C, when the user changes the set duration of the speech-addition section by, for example, spreading the rectangular frame K1 in the width direction with use of a mouse, etc., the acceptable text length is re-calculated according to the changed set duration, and the width of the text box TB2 is changed as well. As illustrated in FIG. 7D, the user enters a text in the text box, the acceptable text length is re-calculated at any time. The width of the text box TB2 also is changed in accordance with the re-calculated result.

Figure 7F:
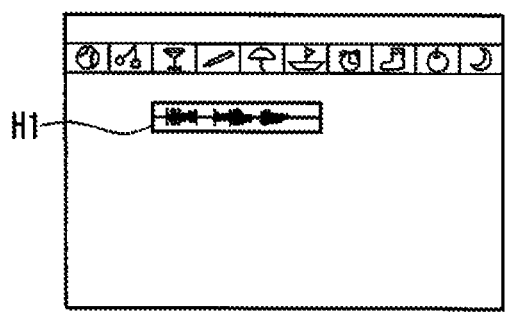

When the user completes the input of an entire text and presses a "SET" button B1 (see FIG. 7E), a synthetic speech of the input text is produced, and is recorded in synchronization with the video data. As illustrated in FIG. 7F, a speech waveform H1 may be displayed on the screen.

Embodiment 3

Figure 8:
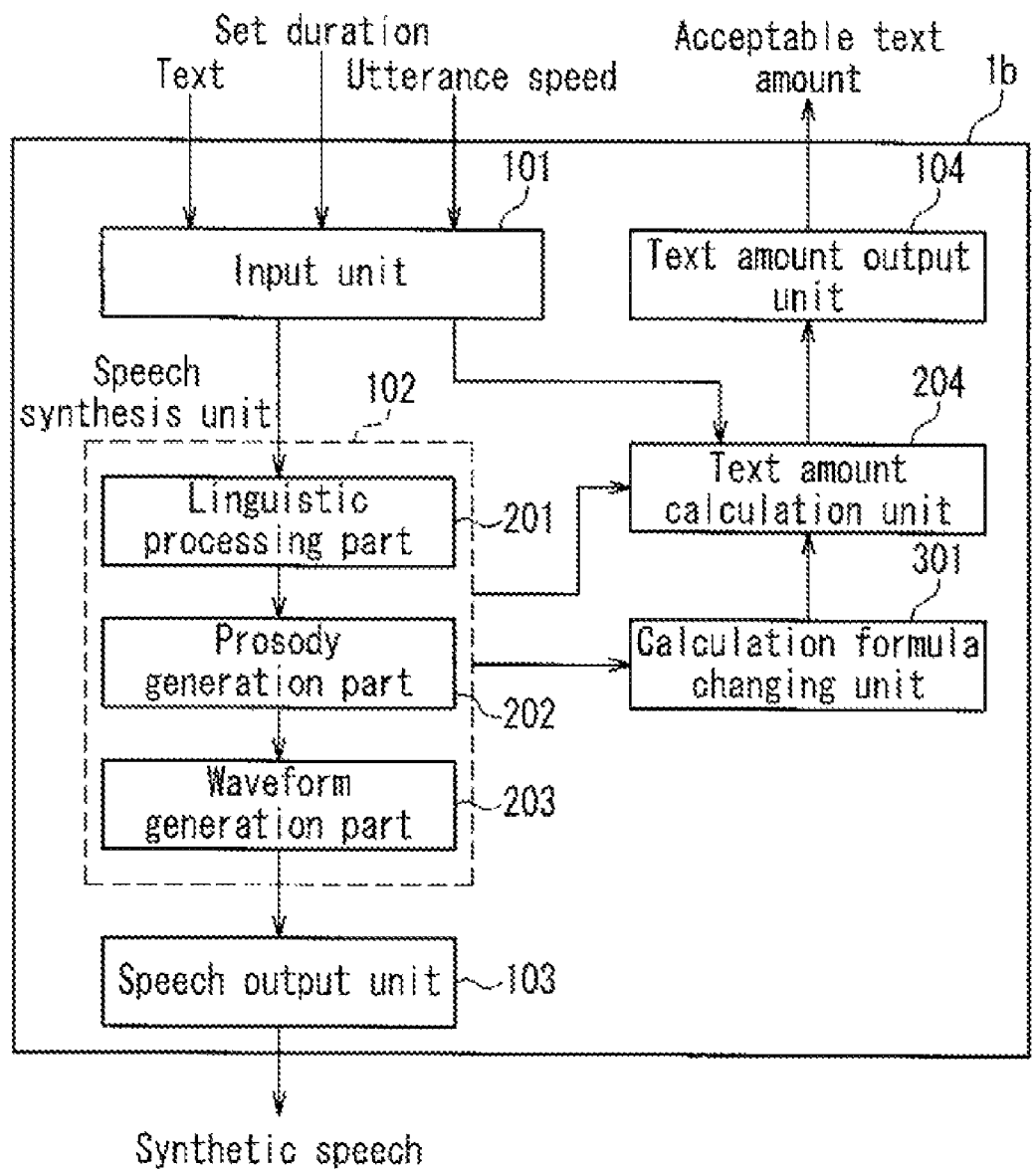
FIG. 8 is a functional block diagram illustrating an exemplary configuration of a synthetic speech text-input device according to Embodiment 3.

FIG. 8 is a functional block diagram illustrating an exemplary configuration of a synthetic speech text-input device 1b according to Embodiment 3. In the synthetic speech text-input device 1b, a speech synthesis unit 102 includes a linguistic processing part 201, a prosody generation part 202, and a waveform generation part 203. Further, the synthetic speech text-input device 1b further includes a calculation formula changing unit 301.

The speech synthesis unit 102 converts a synthetic speech text input via the input unit into a synthetic speech. The speech synthesis unit 102 also generates partial reading information of a text of a portion already received by the input unit as a synthetic speech of the set duration, and a duration of a partial synthetic speech corresponding to the foregoing text.

A text amount calculation unit 204 calculates an amount of a text acceptable as a synthetic speech of the set duration, by substituting the set duration in predetermined calculation formula. The calculation formula changing unit 301 changes the calculation formula used by the text amount calculation unit 204, based on at least either the partial reading information or the duration of the partial synthetic speech generated by the speech synthesis unit 102.

In the above-described configuration, the calculation formula to be used for calculating an acceptable text amount is adjusted with use of an already input text. By so doing, the accuracy in the prediction of the acceptable text amount obtained by calculation can be improved.

In the present embodiment, the text amount calculation unit 204 employs a calculation formula for converting a set duration into a text amount, in order to calculate an acceptable text amount, as a synthetic speech corresponding to a set duration. This formula includes values for conversion of a set duration into a text amount, such as the number of moras per character, and the ratio of voice activity sections in an entire speech. These values can be changed by the calculation formula changing unit 301, based on the reading information, a duration, etc. of an already input text calculated by the speech synthesis section 102.

The reading information is represented by, for example, a character string or a mark string that represents a reading of an input text. The speech synthesis unit 102 or the calculation formula changing unit 301 is capable of calculating an approximate amount of the character string or mark string of the reading information with respect to an amount of input text, from this reading information. Thus, the calculation formula changing unit 301 can adopt, as a value for the calculation formula, the value that represents the relationship between the reading information amount and the input text amount, which is derived from the reading information. For example, a value representing a character string amount (e.g., the number of moras) of reading information per character of a text can be derived from reading information of already input text, and this value can be used as a value used in a calculation formula. From a duration of already input text as well, a value indicative of the relationship between a text amount and a duration of synthetic speech can be derived. The calculation formula changing unit 301 adopts this value in a calculation formula, so as to change the calculation formula.

For example, the linguistic processing part 201 generates a phonogram string as to an already input text. The calculation formula changing unit 301 divides the number of moras represented by the phonogram string by the number of characters of the input text, thereby deriving the number of moras per character. Further, the prosody generation part 202 determines a duration of each mora from the phonogram string, and a duration of a pause as well. Based on these, the calculation formula changing unit 301 can determine a ratio of voice activity sections in an entire speech as to the already input text (Op801).

For example, if the input text is "本日の天気は、曇りのち雨です。" (Note: this sentence means "Today it is cloudy, and rainy later on"), the phonogram string is "ホ゜ (ho)ン (n) ジ (ji)ツ (tsu)ノ (no)テ゜ (te)ン (n)キ (ki)ワ (wa), ク (ku) モ (mo)リ゜ (ri)ノ (no)チ (chi) ア゜ (a)メ (me)テ゜ (de)ス (su)." Thus, the phonogram string has 18 moras with respect to the 15 characters of the input text. Therefore, the number of moras per character can be calculated as 18/15=1.2 moras. It should be noted that the calculation of the number of moras per character may be executed by the linguistic processing part 201, or may be executed by the calculation formula changing unit 301.

Further, if as to the input text, a sum duration of the voice activity sections of "本日の天気は" and "曇りのち雨です" is calculated to be 2.1 seconds and the silence section corresponding to the punctuation marks " " and "。" therebetween is calculated to be 1.5 seconds by the prosody generation part, the ratio of the voice activity sections can be calculated as 2.1/(2.1+1.5)≈0.58. It should be noted that the calculation of ratio of voice activity sections may be executed by the prosody generation part 202, or may be executed by the calculation formula changing unit 301.

Thus, the calculation formula changing unit 301 is capable of correcting the calculation formula by substituting the number of moras per character derived from reading information, a ratio of voice activity section, etc. into the calculation formula. A specific example is as follows: if the utterance speed is assumed to be n mora/sec, the set duration of the speech is assumed to be D seconds, the number of characters of an already input text is assumed to be k, the synthesis duration is assumed to be t, as well as, as described above, the number of moras per character derived from the already input text is assumed to be m', and the ratio of voice activity section is assumed to be r', then a prediction value of the acceptable number of characters is corrected as, for example, the formula (5) below:

$$\text{Acceptable number of characters(predicted)} = k + (D-t) \times r' \times n/m' \quad (5)$$

After the already input text as well, it is highly likely that a text for synthesis is input in the same style. Therefore, the number of moras per character and the ratio of voice activity sections derived from the already input text are more reliable as compared with the preliminarily statistically determined values. Consequently the prediction accuracy of the acceptable number of characters can be increased.

[Exemplary Operation]

Figure 9:
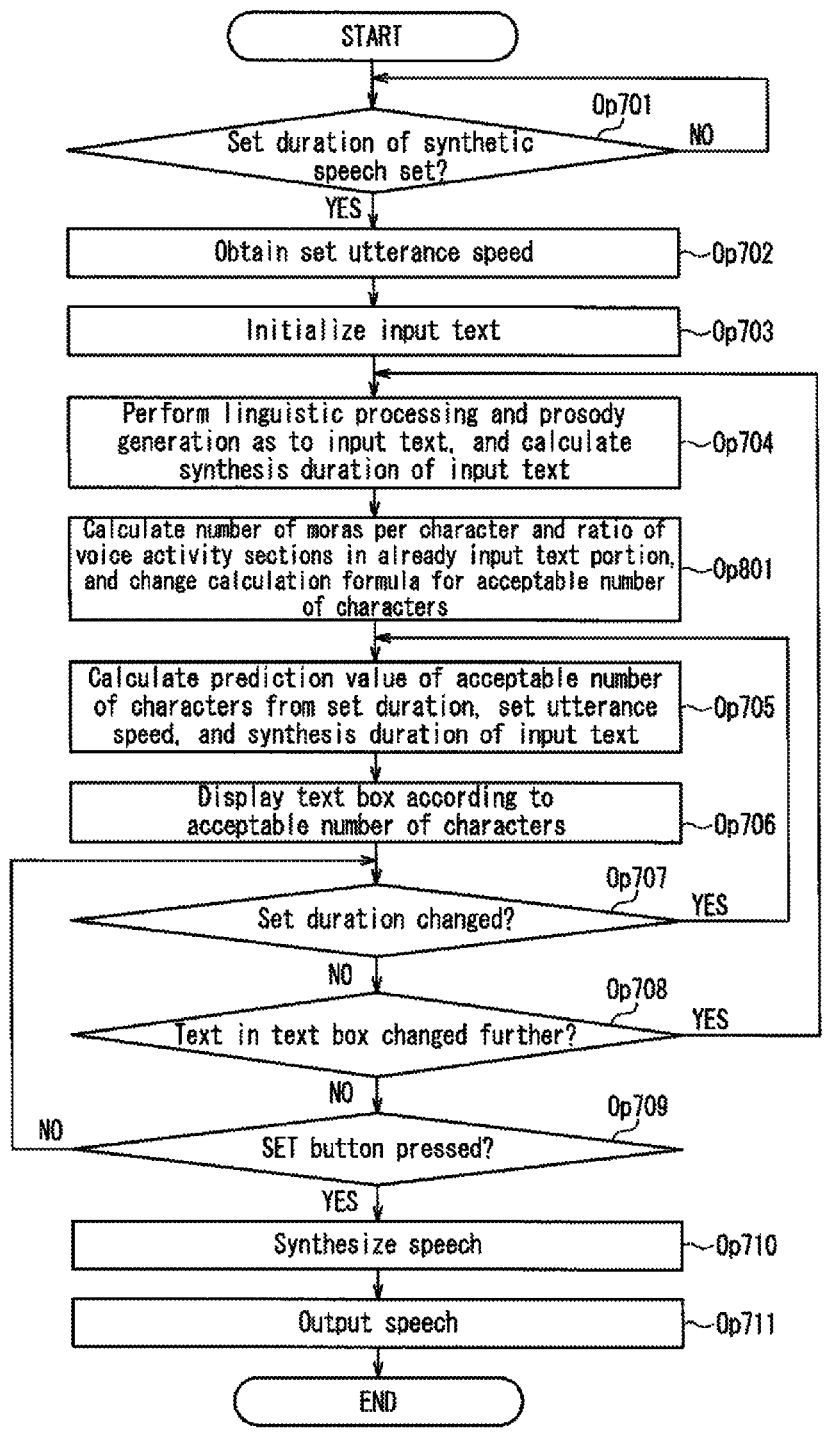
FIG. 9 is a flowchart illustrating an exemplary operation of the synthetic speech text-input device according to Embodiment 3.

FIG. 9 is a flowchart illustrating an exemplary operation of the synthetic speech text-input device 1b according to Embodiment 3. In the example illustrated by FIG. 9, the process from Op701 to Op704 can be performed in the same manner as the process from Op701 to Op704 illustrated in FIG. 5.

In Op801, the calculation formula changing unit 301 calculates, for example, the number m' of moras per character and a ratio r' of voice activity sections, as to an already input text entered in the input text box by the input unit 101. The number m' of moras per character can be calculated with a phonogram string of the already input text determined by the linguistic processing part 201. The ratio r' of voice activity sections is calculated with a duration of the already input text and the duration of a pause determined by the prosody generation part 202. The calculation formula changing unit 301 corrects the calculation formula for an acceptable number of characters so that the formula includes the number m' of moras per character and the ratio r' of voice activity sections. For example, the calculation formula changing unit 301 can correct the calculation formula by updating data indicating terms of the calculation formula recorded in a recording unit of the synthetic speech text-input device 1b. The process from Op705 to Op711 can be performed in the same manner as the process from Op705 to Op711 illustrated in FIG. 5.

As described above, the calculation formula changing unit 301 can increase the accuracy of the acceptable text amount by the text amount calculation part 204, by changing parameters for converting a duration into the number of characters, the parameters included in the calculation formula. It should be noted that the values updated by the calculation formula changing unit 301 are not limited to those in the above-described example. In the case of the English language, the average number of characters per word may be used in place of the number m' of moras per character.

[Example in Case of English Language]

For example, when an input text is "Rain showers in the evening becoming more intermittent overnight", the average number of characters per word calculated by the linguistic processing part 201 is 6.2 characters/word. The prosody generation part 202 calculates a ratio of voice activity sections in an entire duration in the case where the speech of this input text is actually synthesized, finding that the ratio is, for example, 0.85. These are different from a preliminary recorded average number of characters per word, which is 8 characters/word, and a preliminary recorded ratio of voice activity sections, which is 0.7. Thus, the calculation formula changing unit 301 can correct the calculation formula by replacing the preliminarily recorded values with the values calculated by the linguistic processing unit 201 and the prosody generation part 202.

For example, when an utterance speed is assumed to be n words/min and an average font width per character is assumed to be w, if the set duration is D minutes, and further, as described above, the ratio of voice activity sections in an entire speech and the average number of characters per word derived from the input text are assumed to be r' and m', respectively, then the calculation formula as to an acceptable text length is corrected as, for example, the formula (6) below:

$$\text{Acceptable text length(predicted)} = D \times r' \times n \times m' \times w \tag{6}$$

Embodiment 4

Figure 10:
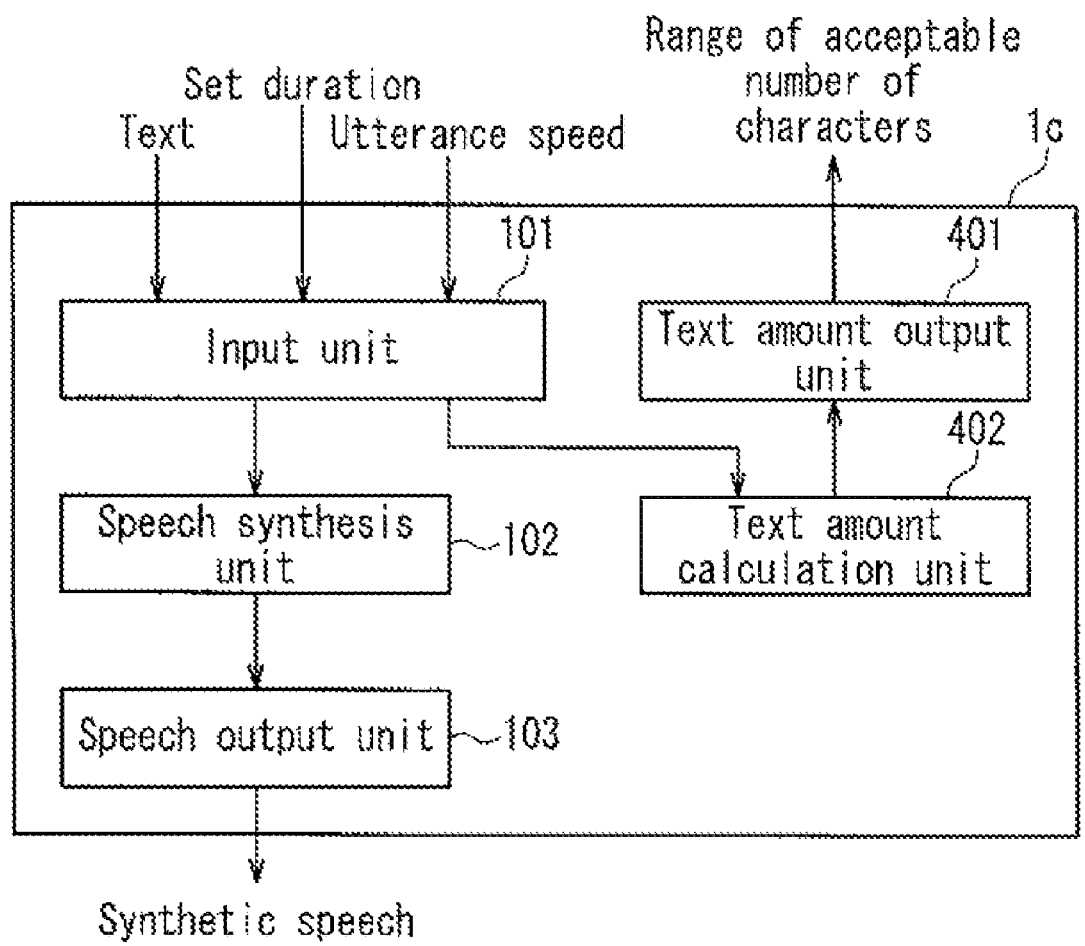
FIG. 10 is a functional block diagram illustrating an exemplary configuration of a synthetic speech text-input device according to Embodiment 4.

FIG. 10 is a functional block diagram illustrating an exemplary configuration of a synthetic speech text-input device 1c according to Embodiment 4. In the synthetic speech text-input device 1c, a text amount calculation unit 402 calculates an upper limit and a lower limit of an amount of a text acceptable as a synthetic speech of a set duration. A text amount output unit 401 outputs a range of the acceptable text amount represented by the upper limit and the lower limit calculated by the text amount calculation unit 402. Thus, a range of an acceptable text amount is outputted, whereby a range of an amount of a text that a user is allowed to enter can be widened.

For example, the utterance speed and the ratio of voice activity sections of a synthetic speed may be varied, as long as it does not cause a listener to have any sense of discomfort. More specifically, in a synthetic speech, it is possible to adjust an entire synthesis duration to some extent by slightly increasing or decreasing the utterance speed, and the number of pauses, and extending/shortening the duration of each pause. Therefore, the text amount calculation unit 402 calculates the acceptable number of characters, not as one value, but as values in a range from the upper limit to the lower limit.

[Exemplary Operation]

Figure 11:
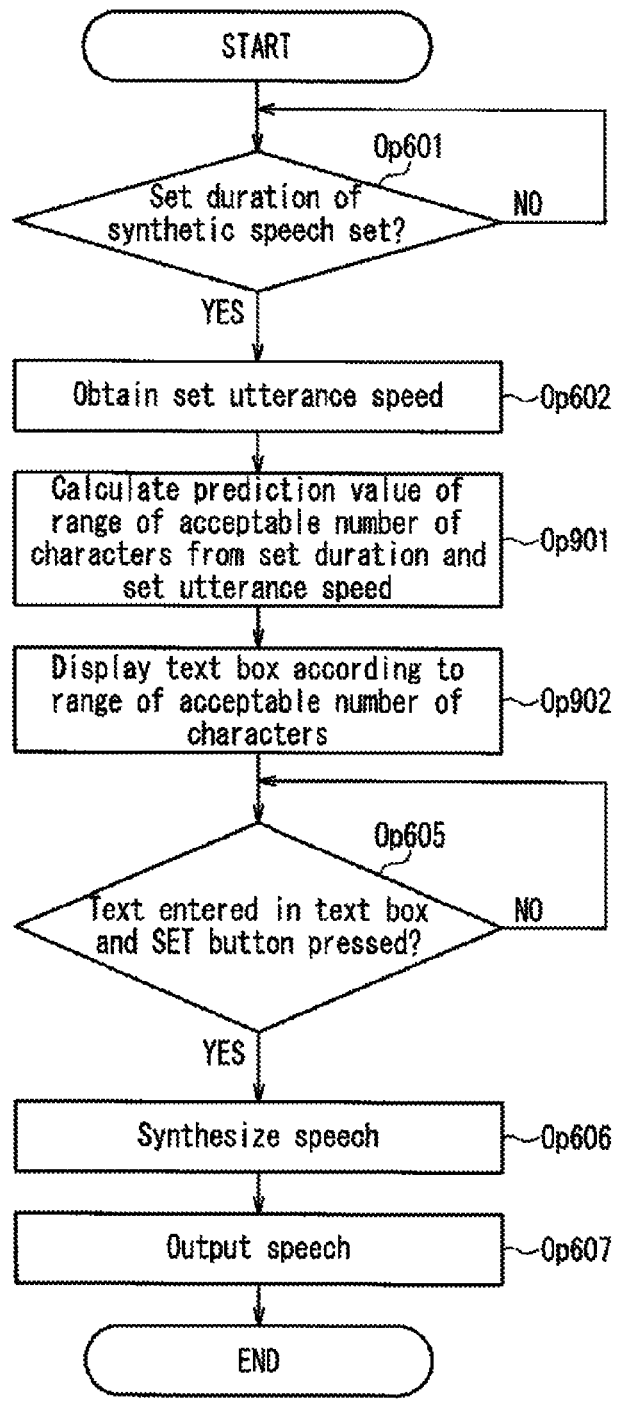
FIG. 11 is a flowchart illustrating an exemplary operation of the synthetic speech text-input device according to Embodiment 4.

FIG. 11 is a flowchart illustrating an exemplary operation of the synthetic speech text-input device 1c. The process of Op601 and Op602 illustrated in FIG. 11 can be executed in the same manner as that of the process of Op601 and Op602 illustrated in FIG. 2. At Op901, the text amount calculation unit 402 calculates the upper limit and the lower limit of an acceptable number of characters.

For example, the utterance speed can be recorded, as "n moras/sec" or the like, preliminarily in the synthetic speech text-input device 1c. A ratio of voice activity sections in an entire speech is assumed to be r, and an average number of moras per character of a text is assumed to be m. If the ratio at which the utterance speed can be varied without causing a feeling of discomfort when a synthetic speech is listened to is assumed to be Rn, the ratio at which a proportion of voice activity sections can be varied by increasing/decreasing the number of pauses or extending/shortening the duration of each pause is assumed to be Rr, and the set duration is D, then the upper limit and the lower limit of the number of acceptable characters can be calculated by, for example, the formulae (7) and (8) below:

$$\text{Upper limit of acceptable number of characters(predicted)} = D \times r \times (1+Rr) \times n \times (1+Rn)/m \tag{7}$$

$$\text{Lower limit of acceptable number of characters(predicted)} = D \times r/(1+Rr) \times n/(1+Rn)/m \tag{8}$$

For example, if the ratio Rr at which the proportion of voice activity sections can be varied is assumed to be 10%, and the ratio Rn at which the utterance speed can be varied is assumed to be 5%, then the upper limit and the lower limit of the acceptable number of characters can be calculated as follows:

$$\text{Upper limit of acceptable number of characters(predicted)} = D \times r \times 1.1 \times n \times 1.05/m$$

$$\text{Lower limit of acceptable number of characters(predicted)} = D \times r/1.1 \times n/1.05/m$$

The text amount calculation unit 402 calculates the upper limit and the lower limit of the acceptable number of characters, using the above-described formulae (7) and (8), and then, the text amount output unit 401 presents the range of acceptable number of characters represented by the upper limit and the lower limit to a user (Op902). The subsequent process from Op605 to Op607 can be executed in the same manner as that from Op605 to Op607 illustrated in FIG. 2.

[Exemplary Display Screen]

Figure 12:
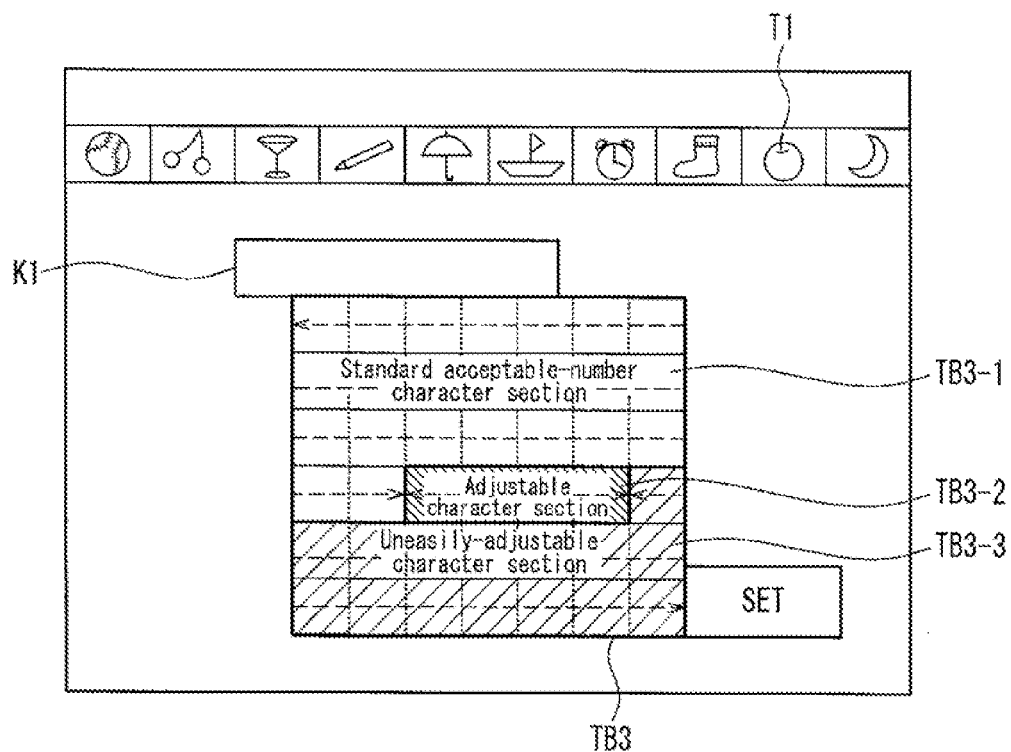
FIG. 12 is an exemplary screen that displays a range of the acceptable number of characters.

FIG. 12 is an exemplary screen that displays a range of the acceptable number of characters output by the text amount output unit 401. In the example illustrated by FIG. 12, since the entry of characters from the first square up to the lower limit is required, white squares for these are displayed as a standard acceptable-number character section TB3-1. Since the entry in the range from the lower limit to the upper limit is optional, a light-gray squares are displayed as an adjustable character section TB3-2. It should be noted that, as described later, even if the number of characters of an input text exceeds the upper limit of the acceptable number of characters, it is possible to synchronize an audio with a video by increasing the utterance speed, decreasing pauses, extending the video data, or other methods, and accordingly, spare squares may be displayed so as to allow a user to enter characters. In this case, the spare squares may be displayed in dark-gray color as an uneasily-adjustable character section TB3-3, as illustrated in FIG. 12, so as to allow a user to recognize it as such.

Thus, the text amount output unit 401 preferably displays a text box corresponding to the acceptable number of characters, since this allows a user to intuitively know it. The display screen, however, is not limited to the above-described example.

[Example in Case of English Language]

In the case where a synthetic speech and an input text are in English, the text amount calculation unit 402 can calculate the range of acceptable text amount as described below, for example. The utterance speed can be recorded preliminarily, as "n words/min" or the like, in the synthetic speech text-input device 1c. The ratio of voice activity section in an entire speech, the average number of characters per word, and the average font width per character are assumed to be r, m, and w, respectively. Further, the ratio at which the utterance speed can be varied without causing a feeling of discomfort when a synthetic speech is listened to is assumed to be Rn, and the ratio at which a proportion of voice activity sections can be varied by increasing/decreasing the number of pauses or the duration of each pause is assumed to be Rr. When the set duration is D, the upper limit and the lower limit of the acceptable text length can be calculated by, for example, the formulae (9) and (10) below:

$$\text{Upper limit of acceptable text length(predicted)} = D \times r \times (1+Rr) \times n \times (1+Rn) \times m \times w \quad (9)$$

$$\text{Lower limit of acceptable text length(predicted)} = D \times r / (1+Rr) \times n / (1+Rn) \times m \times w \quad (10)$$

For example, if the ratio Rr at which the proportion of voice activity sections can be varied is assumed to be 10%, and the ratio Rn at which the utterance speed can be varied is assumed to be 5%, these result in the following:

$$\text{Upper limit of acceptable text length(predicted)} = D \times r \times 1.1 \times n \times 1.05 \times m \times w$$

$$\text{Lower limit of acceptable text length(predicted)} = D \times r / 1.1 \times n / 1.05 \times m \times w$$

Figure 13:
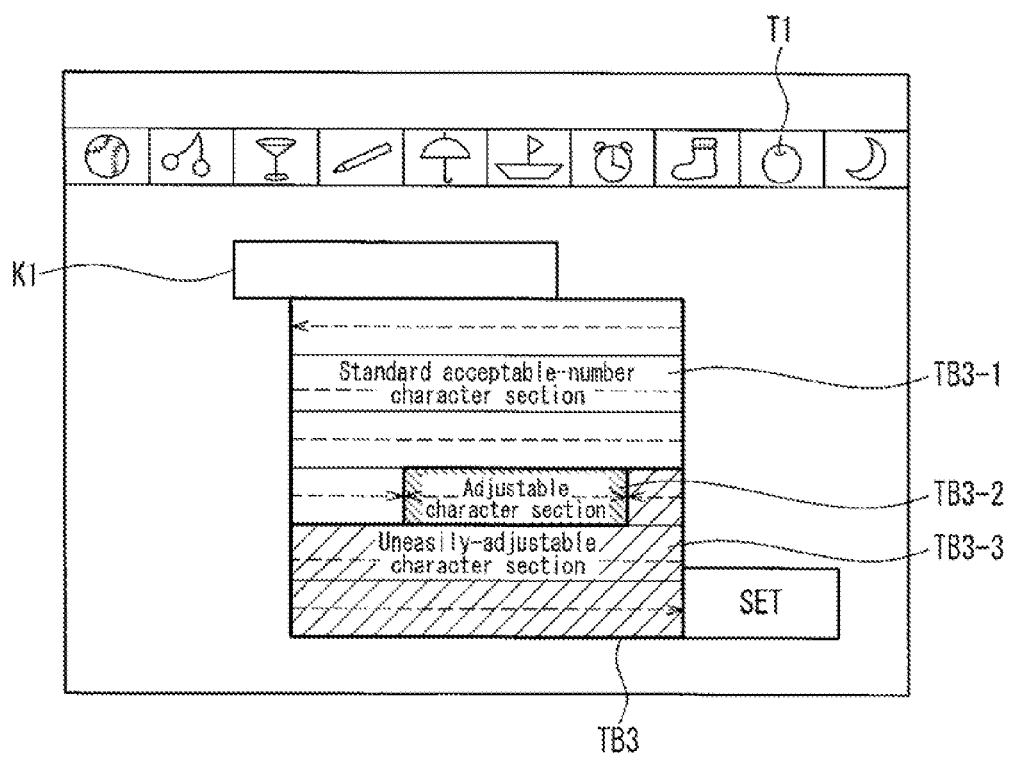
FIG. 13 is an exemplary screen that displays a range of an acceptable text length in the case of the English language.

FIG. 13 is an exemplary screen that displays a range of an acceptable text length in the case of the English language. In the example illustrated in FIG. 13, a range from the first character up to the lower limit of the acceptable number of characters is displayed with a white-background text box without squares, as a standard acceptable-number character section TB3-1. A range from the lower limit to the upper limit, in which the entry is optional, is displayed in light-gray color, as an adjustable character section TB3-2. Further, a range exceeding the upper limit of the acceptable number of characters, in which the entry of a text is not preferable, is displayed in dark-gray color, as an uneasily-adjustable character section TB3-3. Thus, in the case where a synthetic speech and an input text are in English, a text box without squares can displayed, and in the text box, the standard acceptable-number character section, the adjustable character section, and the uneasily-adjustable character section are colored differently so that they can be distinguished.

The above-described embodiment can be embodied in combination with Embodiments 1 to 3.

Embodiment 5

Figure 14:
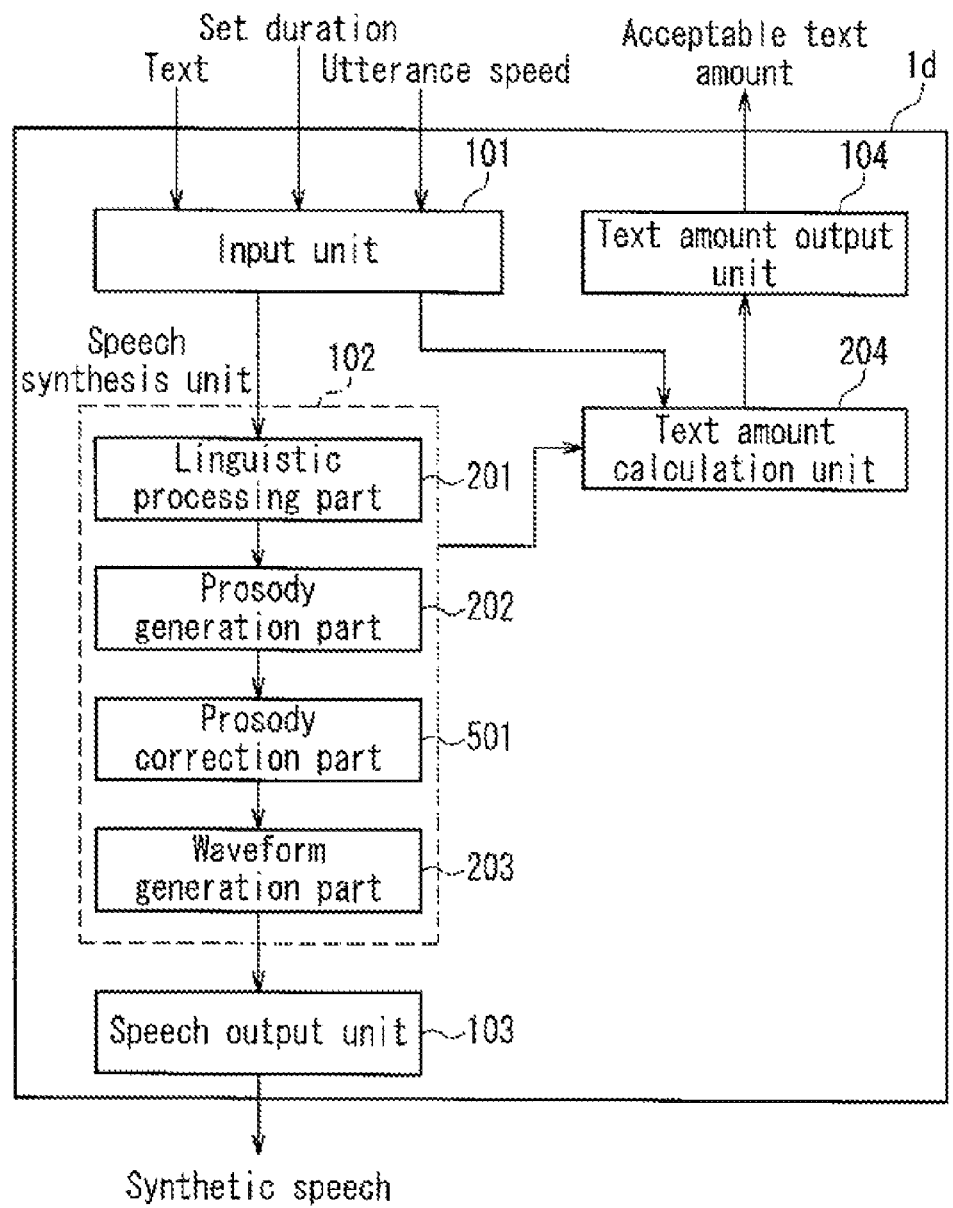
FIG. 14 is a functional block diagram illustrating an exemplary configuration of a synthetic speech text-input device according to Embodiment 5.

FIG. 14 is a functional block diagram illustrating an exemplary configuration of a synthetic speech text-input device 1d according to Embodiment 5. In the synthetic speech text-input device 1d, the speech synthesis unit 102 includes a linguistic processing part 201, a prosody generation part 202, a prosody correction part 501, and a waveform generation part 203. The linguistic processing part 201 analyzes a text for a synthetic speech input via the input unit 101, and generates an intermediate expression including reading information of the text. The prosody generation part 202 generates a duration of a synthetic speech corresponding to the text, and a pitch pattern as a variation pattern of a pitch of the synthetic speech corresponding to the text, from the intermediate expression generated by the linguistic processing part 201. The waveform generation part 203 generates a synthetic speech, based on the duration of the synthetic speech corresponding to the text, and the pitch pattern as a variation pattern of a pitch of the synthetic speech corresponding to the text.

The prosody correction part 501 extends or shortens the duration of the synthetic speech generated by the prosody generation part 202, or extends or shortens a duration of a pause included in the synthetic speech, so that the duration of the synthetic speech approaches the set duration. In this configuration, the duration of a synthetic speech to be synthesized is adjusted by the prosody correction part 501 so as to approach the set duration. Therefore, for example, even if a user enters a text having characters less than, or more than, the acceptable number of characters, the duration of a synthetic speech can be adjusted so as to match the set duration.

[Exemplary Operation]

Figure 15:
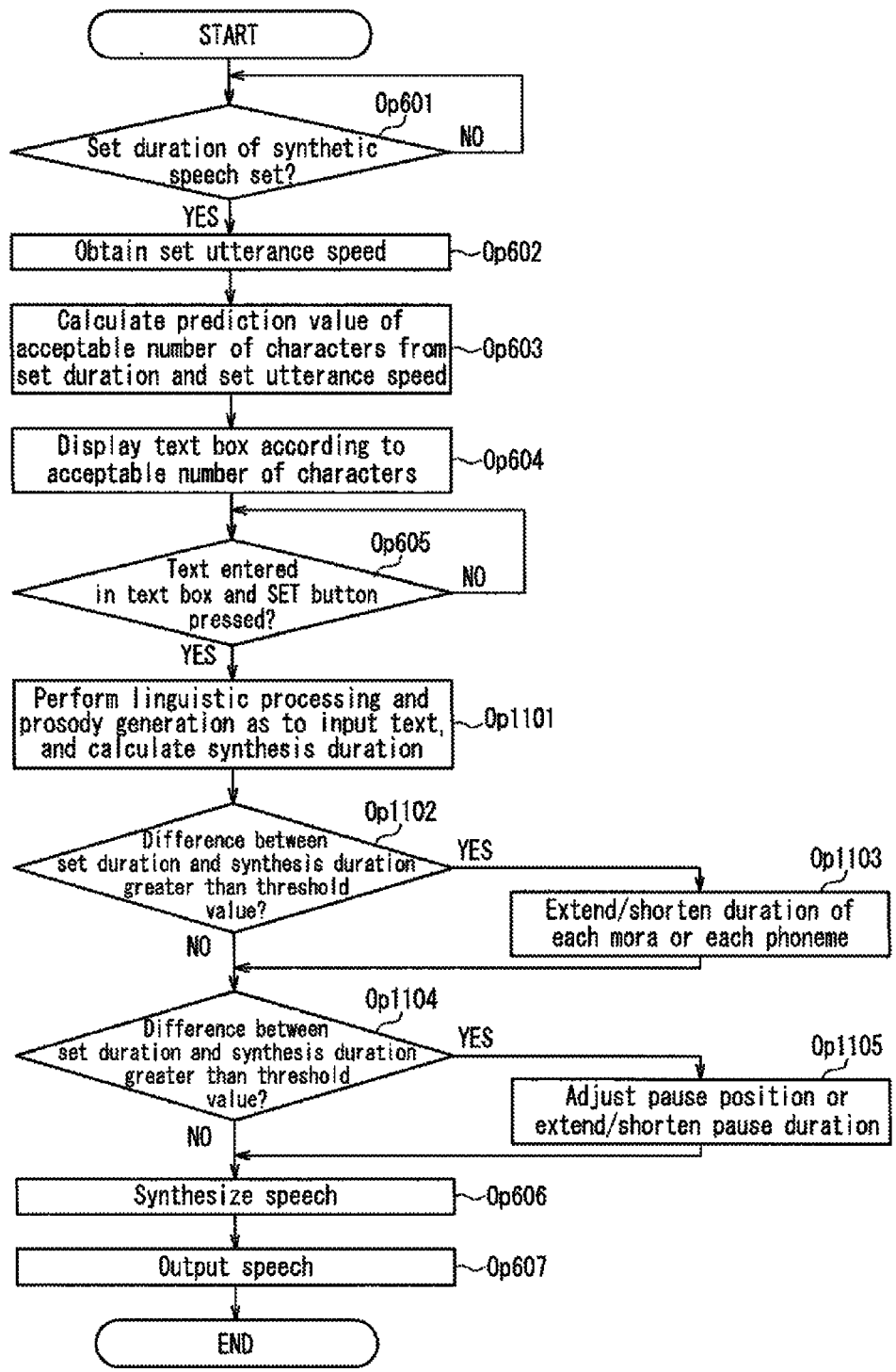
FIG. 15 is a flowchart illustrating an exemplary operation of the synthetic speech text-input device.

FIG. 15 is a flowchart illustrating an exemplary operation of the synthetic speech text-input device 1d. The process from Op601 to Op605 in FIG. 15 can be executed in the manner as that of the process from Op601 to Op605 in FIG. 2. When a text entered by a user is fixed (Op605: YES) according to the acceptable number of characters output by the text amount output unit 104, the linguistic processing part 201 produces a phonogram string for the text entered by the user, and the prosody generation part 202 generates a synthesis duration (Op1101).

The prosody generation part 202, for example, determines phonemes and durations of phonemes corresponding to the phonogram string, based on dictionaries and rules recorded preliminarily. Thus, the prosody generation part 202 can determine speech units (e.g., phonemes) composing an input text, and determines a duration for each audio unit. In this case, a sum of the respective durations of speech units is regarded as a synthesis duration of the input text.

When determining that a difference between the set duration and a duration of a speech actually synthesized is greater than a threshold value (Op1102; YES), the prosody correction unit 501 extends/shortens the duration of each mora generated, or the duration of each phoneme composing each mora so that the synthesis duration approaches the set speech duration (Op1103). For example, the prosody correction unit 501 may equally extend/shorten each mora or each phoneme duration by multiplying it by the same factor; or alternatively, the prosody correction unit 501 may set ranges of coefficients for extending/shortening phonemes of different types, respectively, and perform extension/shortening in the set ranges. Since an unnatural synthetic speech is obtained in case of excessive extension or shortening, it is preferable that an upper limit and a lower limit are set for the extension/shortening coefficients and the extension/shortening may be performed so as not to be beyond the set ranges.

In the case where a difference between the set speech duration and a duration of an actually synthesized speech is greater than a threshold value even if the duration of each mora or each phoneme is extended to a limit (Op1104; YES), the prosody correction part 501 adjusts positions of pauses, or extends/shortens durations of pauses, thereby causing the actual speech duration to approach the set speech duration (Op1105). The adjustment of positions of pauses is performed by, for example, adding new pauses to phrases having no pause or to boundaries between phrases in phonogram strings generated by linguistic processing part 201, or deleting pauses in the phonogram strings. The extension/shortening of durations of pauses may be extension or shortening of durations of pauses set by the prosody generation part 202.

When the synthesis duration is adjusted through the process from Op1101 to Op1105, and a pitch pattern is corrected in accordance with the adjustment result, the wavelength generation part 203 generates a synthetic speech (Op606), and the speech output unit 103 outputs the synthetic speech (Op607).

Figure 16A:
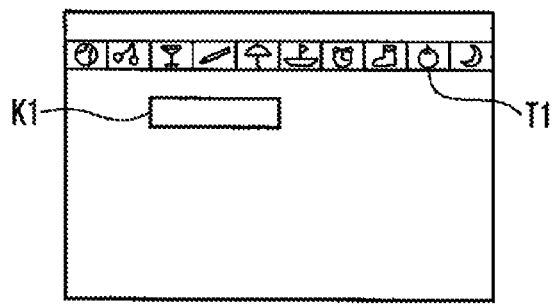
FIGS. 16A to 16F are diagrams illustrating exemplary screen transition displayed on a display in Embodiment 5.
Figure 16B:
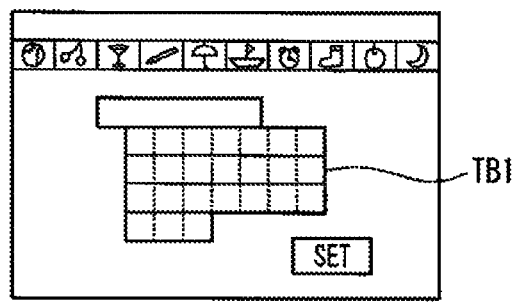
Figure 16C:
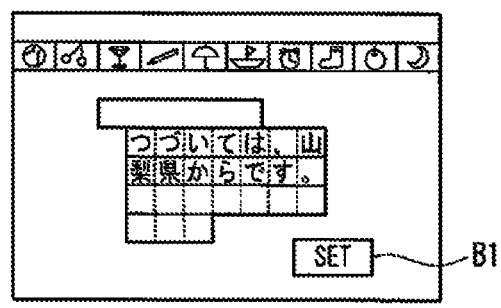
Figure 16D:
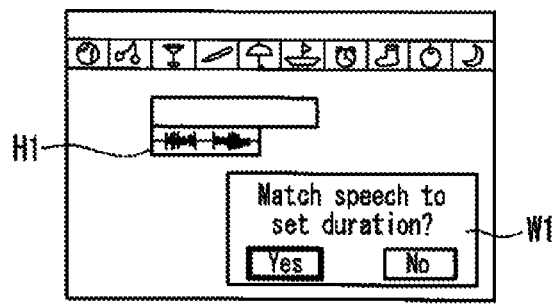
Figure 16E:
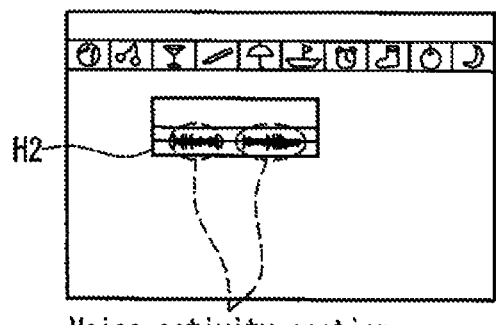

FIGS. 16A to 16F are diagrams illustrating exemplary screen transition displayed on a display in Embodiment 5. FIGS. 16A and 16B are similar to FIGS. 3A and 3B. The screen illustrated in FIG. 6C is an exemplary screen when a user presses the SET button at a stage where the user has entered fewer characters than the acceptable number of characters. In FIG. 16D, a rectangular frame K1 whose width indicates a set duration, that is, a length of a synthetic speech-addition section, and a speech waveform H1 of an actually synthesized speech are juxtaposed to each other. This allows a user to know that the actually synthesized speech is shorter than the length of the speech-addition section. In this case, on the screen, a dialogue window W1 is displayed which asks the user whether or not to extend the synthetic speech so that the synthetic speech matches the set duration (the length of the speech-addition section). With this dialogue window W1, the user is asked about whether or not the duration of the synthetic speech is to be adjusted by the prosody correction part 501.

When the user selects "YES", the prosody correction part 501 makes recalculation to extend the duration of each mora and each phoneme so that the synthetic speech has the same duration as the set duration. When the duration of each mora or each phoneme is extended, the pitch pattern is also corrected so that it matches the extended duration, and the wavelength generation part 203 regenerate a synthetic speech. A re-synthesized speech waveform is displayed (see FIG. 16E). In the example illustrated in FIG. 16E, a speech waveform H2 of a synthetic speech is displayed, the synthetic speech having a duration of each speech unit (herein, each phoneme as an example) extended so that the synthetic speech has the same duration as the set duration.

Figure 16F:
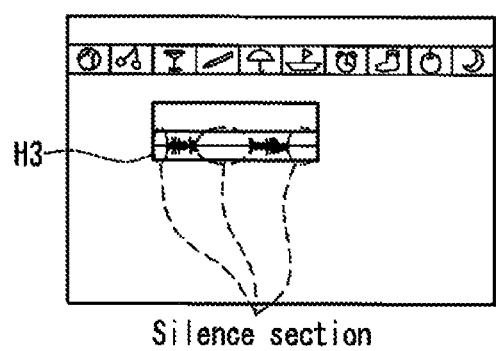

It should be noted that when the user selects "YES" in the dialogue window W1, the prosody correction part 501 may adjust the synthetic speech by extending a duration of a pause so that the synthetic speech has the same duration as the set duration. FIG. 16F is a diagram illustrating an example in the case where a speech waveform H3 of a synthetic speech is displayed that has durations of pauses extended so that the synthetic speech has the same duration as the set duration.

A case in which characters of a text entered by a user are fewer is depicted as the present example herein, but in the case where characters of a text entered by a user are more than the acceptable number of characters, at least either an operation of shortening the duration of each mora or each phoneme, or an operation of shortening durations of pauses may be performed, so that a synthetic speech is adjusted so as to have the same duration as the set duration. It should be noted that the prosody correction unit 501 is not necessarily required to make adjustment to an extent that a duration of a synthetic speech and the set duration are strictly identical to each other.

Embodiment 6

Figure 17:
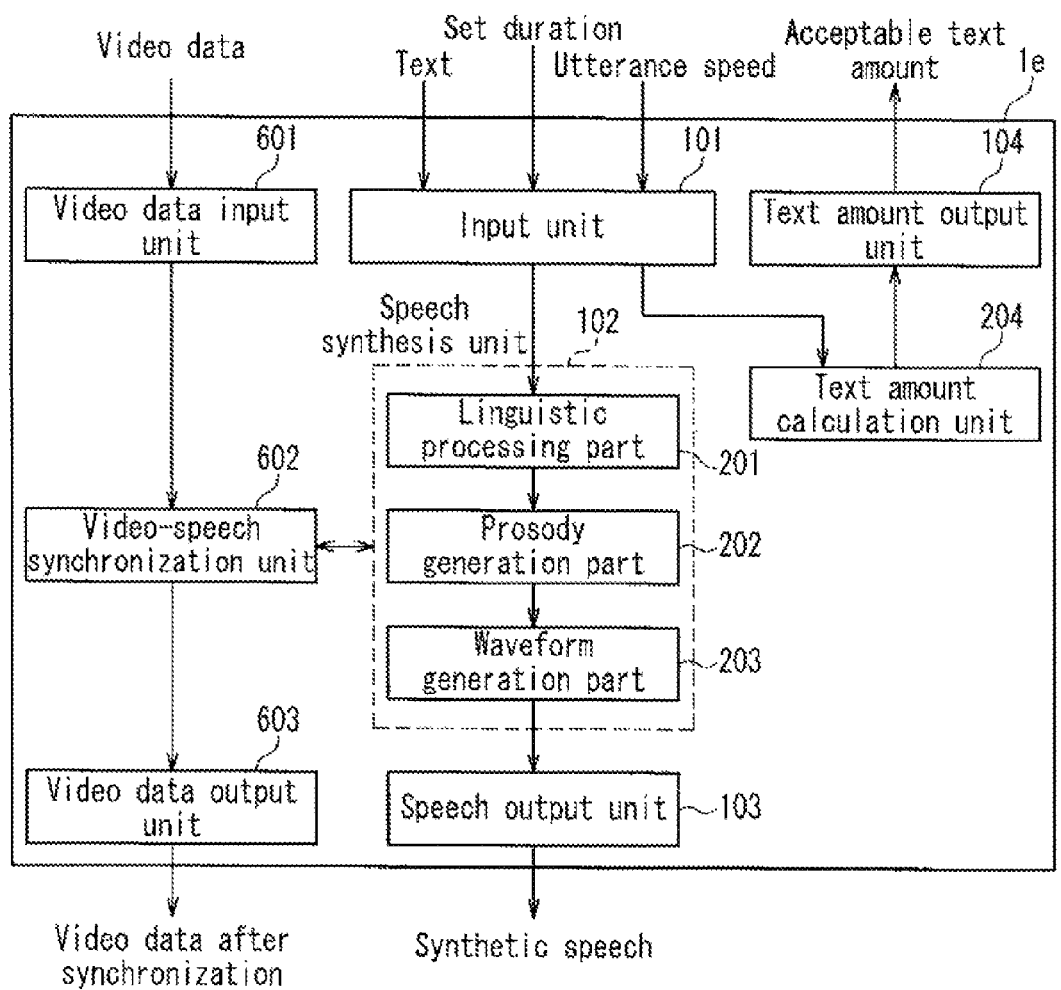
FIG. 17 is a functional block diagram illustrating an exemplary configuration of a synthetic speech text-input device according to Embodiment 6.

FIG. 17 is a functional block diagram illustrating an exemplary configuration of a synthetic speech text-input device 1e according to Embodiment 6. The synthetic speech text-input device 1e includes a video data input unit 601 that inputs video data including a section that is to be synchronized with a synthetic speech of the text received by the input unit 101, and a video-speech synchronization unit 602 that edits video data so that a duration of the synthetic speech generated by the speech synthesis unit 102 approaches the set duration. With this configuration, video data can be adjusted so as to match a duration of a synthetic speech.

For example, in the case where the synthetic speech text-input device 1e is used for text input of a synthetic speech to be used by a video editing device (video editing system), when a user enters a text having fewer or more characters than an acceptable number of characters or a range of the number of characters corresponding to the set duration, the video data can be extended/shortened by the video-speech synchronization unit 602 so as to be synchronized with the synthetic speech.

In the present embodiment, the input unit 101 receives a designation of at least a part of sections of video data from a user, and makes a duration corresponding to the designated section the set duration. In this case, the user is allowed to, for example, designate a section to which a speech is to be added, in the video data. The speech synthesis unit 102 records the synthesized speech and the video data in synchronization with each other, using information indicative of a position of the speech-addition section in the video data. The video-speech synchronization unit 602 is capable of specifying a position in the video data at which editing is to be carried out, according to the information indicative of a position of the speech-addition section in the video data.

The video-speech synchronization unit 602 causes a duration of a speech-addition section to match a duration of a synthetic speech, by, for example, shortening or extending the duration of the speech-addition section in the video data. For example, by cutting out a part of frames in the speech-addition section in the video data, the duration of the speech-addition section can be shortened, and by adding a frame to the speech-addition section, the speech-addition section can be extended.

[Exemplary Operation]

Figure 18:
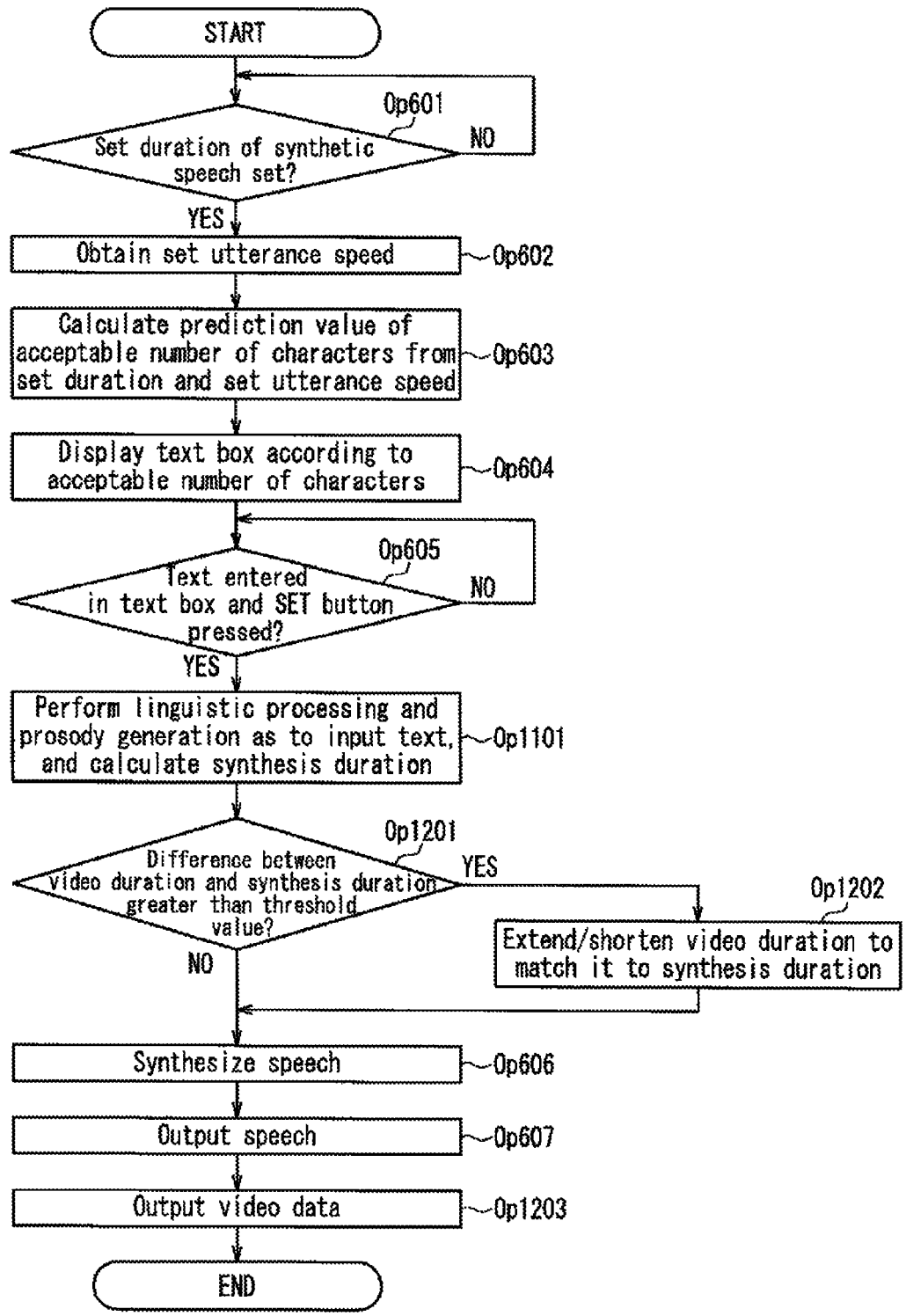
FIG. 18 is a flowchart illustrating an exemplary operation of the synthetic speech text-input device.

FIG. 18 is a flowchart illustrating an exemplary operation of the synthetic speech text-input device 1e. The process from Op601 to Op605 in FIG. 18 can be executed in the same manner as the process from Op601 to Op605 illustrated in FIG. 2. The process in Op1101 in FIG. 18 can be executed in the same manner as the process in Op1101 in FIG. 15. In other words, when a text entered by a user is fixed (Op605: YES), the linguistic processing part 201 produces a phonogram string based on the text entered by the user, and the prosody generation part 202 generates a duration of a synthetic speech (Op1101).

When determining that a difference between a length (i.e., set duration) of a speech-addition section in which a speech is to be added to video data and a duration of a synthetic speech is greater than a threshold value (Op1201: YES), the video-speech synchronization unit 602 extends/shortens the duration of the speech-addition section in the video data so that the duration matches the synthesis duration (Op1202). As the method for extending/shortening video data, for example, repetition and cut-out of videos are available, but the method is not limited to these. The waveform generation part 203 generates a synthetic speech, and records the same in synchronization with the video data. While the speech output unit 103 outputs the synthetic speech after synchronization (Op607), the video data output unit 603 outputs the video data after synchronization (Op1203).

[Exemplary Screen Transition]

Figure 19A:
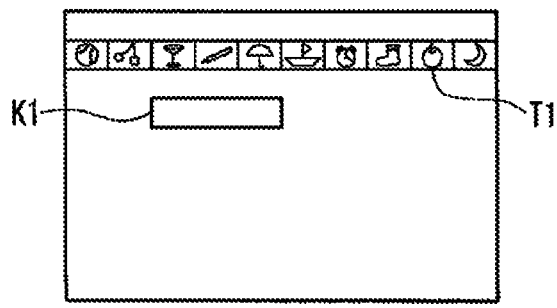
FIGS. 19A to 19E are diagrams illustrating exemplary screen transition displayed on a display in the exemplary operation illustrated in FIG. 6.
Figure 19B:
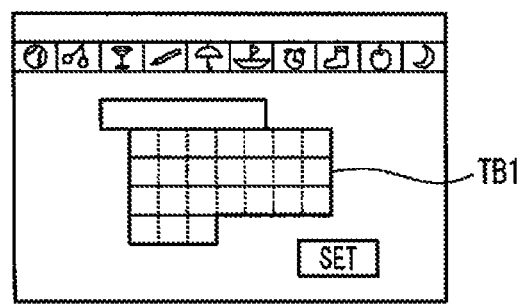
Figure 19C:
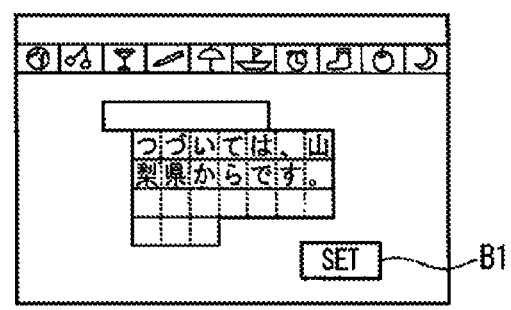

FIGS. 19A to 19E are diagrams illustrating exemplary screen transition displayed on a display in the exemplary operation illustrated in Embodiment 6. FIGS. 19A to 19C are identical to FIGS. 16A to 16C. In other words, the present example is an example in which a user presses the SET button at a stage where the user has entered fewer characters than the acceptable number of characters, as shown in FIG. 19C.

Figure 19D:
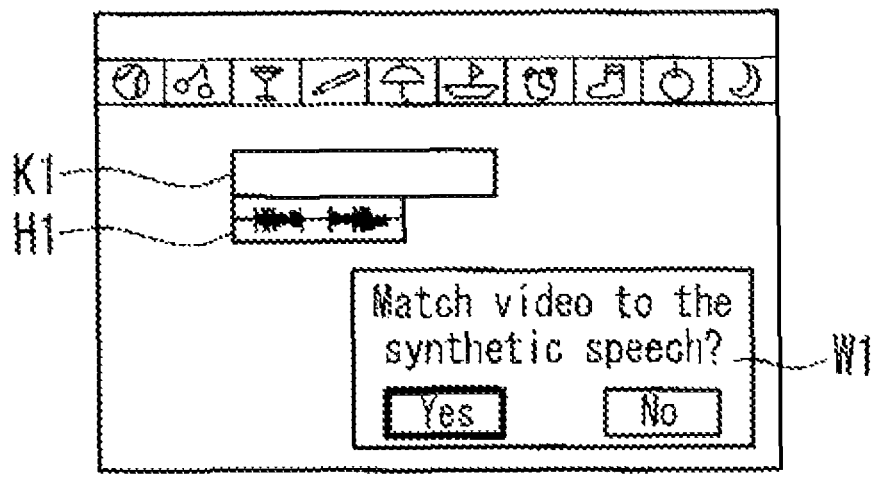

In FIG. 19D, a rectangular frame K1 whose width indicates a set duration, that is, a length of a synthetic speech-addition section, and a speech waveform H1 of an actually synthesized speech are juxtaposed to each other. This allows a user to know that the actually synthesized speech is shorter than the length of the speech-addition section. In this case, on the screen, a dialogue window W1 is displayed which asks the user whether or not to perform an editing operation to cause the speech-addition section in the video data to match the synthetic speech.

Figure 19E:
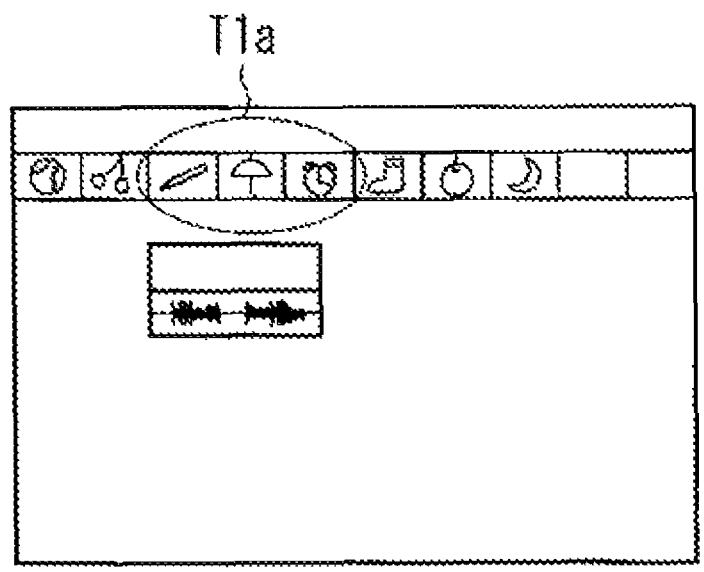

If the user selects "YES", the video-speech synchronization unit 602 shortens the video data by cutting out the same appropriately or the like, to cause the duration of the speech-addition section to match a duration of the speech. FIG. 19E is an exemplary screen in which thumbnail images T1a of shortened videos are displayed. It should be noted that a case in which a text entered by a user is smaller than a set duration is depicted as the present example; in the case where the text entered by a user has more characters than the acceptable number of characters, the video-speech synchronization unit 602 extends the speech-addition section in the video data by, for example, a method of appropriately repeating video data, thereby causing the section to match the speech duration.

Embodiment 7

Figure 20:
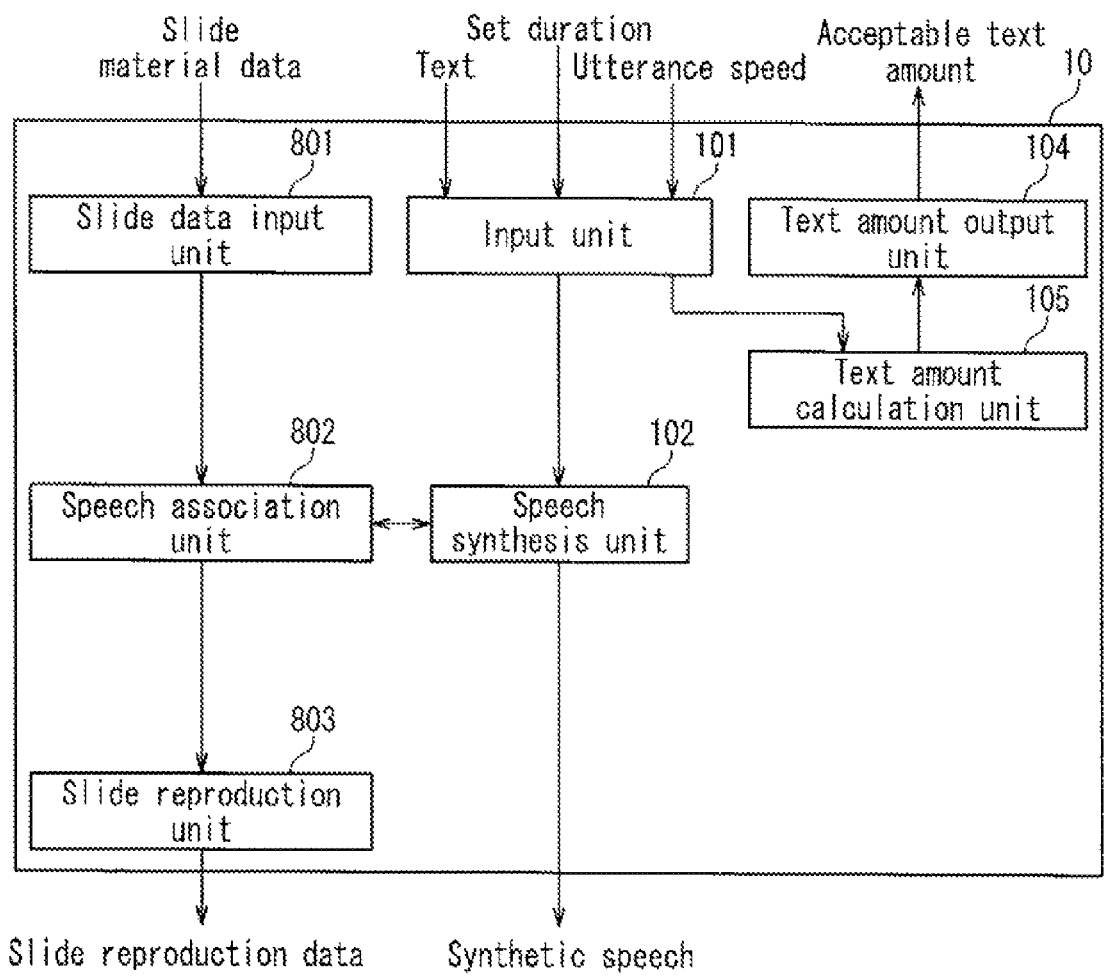
FIG. 20 is a functional block diagram illustrating an exemplary configuration of a slide editing system according to Embodiment 7.

FIG. 20 is a functional block diagram illustrating an exemplary configuration of a slide editing system 10 including the synthetic speech text-input device 1 according to Embodiment 1 described above. In the example illustrated in FIG. 20, the slide editing system 10 further includes a slide material input unit 801, a slide-speech association unit 802, and a slide reproduction unit 803, in addition to the synthetic speech text-input device 1. The slide material input unit 801 reads slide material data recorded in a recording device, pursuant to an instruction from a user, thereby making the slide material data into a state editable by the slide editing system 10. The slide-speech association unit 802 records the slide material data and a synthetic speech synthesized by the speech synthesis unit 102, in a state associated with each other. The slide reproduction unit 803 reproduces slides in synchronization with reproduction of a synthetic speech.

[Exemplary Screen]

Figure 21:
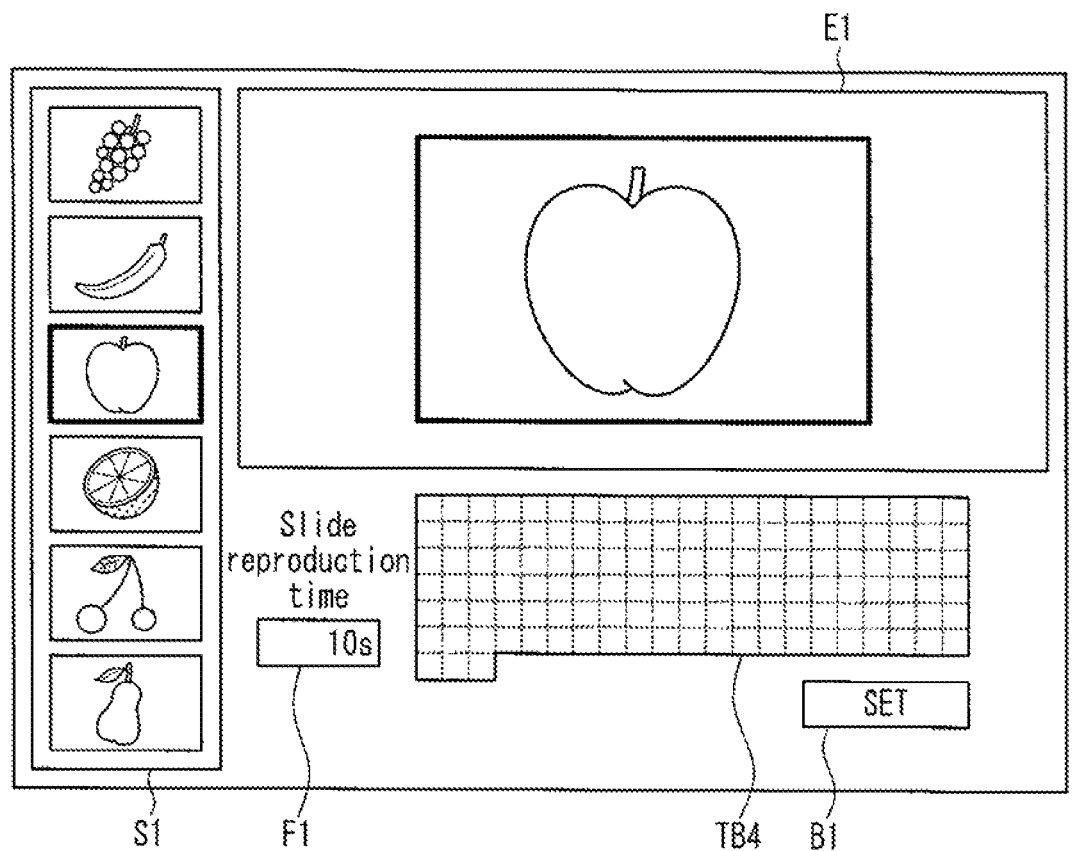
FIG. 21 is an exemplary screen displayed on the slide editing system.

FIG. 21 is an exemplary screen displayed on the slide editing system 10. In the example illustrated by FIG. 21, all of slides are displayed in a left column 51 in the screen, in a vertically aligned state. In FIG. 21, the third slide from the top is selected, and the selected slide is zoomed in at the center of the screen, in an editing region E1, and is ready to be edited. The input unit 101, via GUI, causes the display device to display an input form F1 in which a set duration is to be input, below the editing region E1. Further, the input unit 101 also causes the display device to display a text box TB4 below the slides. The text box TB4 is a text box for entry of texts of synthetic speeches to be associated with slides.

When a speech that explains the slide in the editing region E1 is produced using a synthetic speech, a user enters a reproduction duration, that is, a set duration, in the input form F1. When the set duration is entered, the text amount calculation unit 105 calculates the acceptable number of characters corresponding to the set duration. The text amount output unit 104, via GUI, causes the display device to display a text box TB4 having squares in the number corresponding to the acceptable number of characters thus calculated. The user enters a text in this text box TB4, and fixes the text by pressing the SET button B1. When the text is fixed, the speech synthesis unit 102 generates a synthetic speech, and the video-speech association unit 802 records the synthetic speech in association with the data of the slide in the editing region E1. Thus, the synthetic speech is added to the slide. As a result, the synthetic speech can be reproduced in synchronization with the slide reproduction.

With the slide editing system according to the present embodiment, a user, designating a reproduction duration of a slide, knows an amount of a text of a speech that can be reproduced within the reproduction duration. Therefore, it is possible to efficiently enter a text of a synthetic speech that matches the slide reproduction duration. It should be noted that the synthetic speech text-input devices according to Embodiments 2 to 6 can be incorporated likewise in the slide editing system.

[Exemplary Hardware Configuration]

Figure 22:
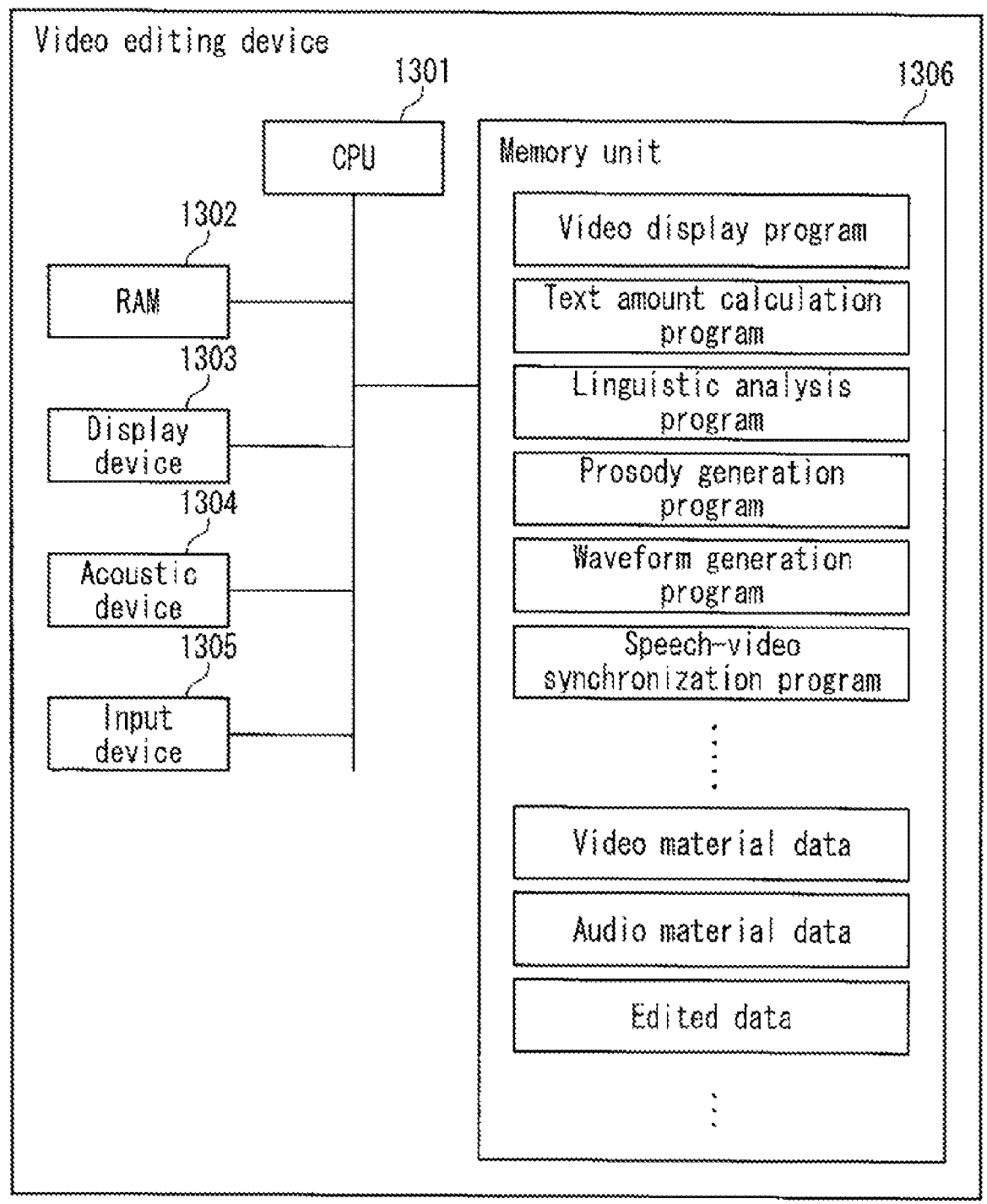
FIG. 22 is a diagram illustrating an exemplary configuration of a computer that incorporates a video editing device including the synthetic speech text-input device according to Embodiments 1 to 6.

FIG. 22 is a diagram illustrating an exemplary configuration of a computer that incorporates a video editing device including any one of the synthetic speech text-input devices 1a to 1e according to Embodiments 1 to 6. The computer includes a CPU 1301 that controls operations of the device, a RAM 1302 that stores data temporarily, a display device 1303 that displays videos and GUI for editing, such as a CRT or a LCD, an acoustic device 1304 such as a speaker for outputting synthetic speeches and a headphone, an input device 1305 such as a keyboard, a mouse, and a pointing device that allows a user to enter an operation into the video editing device, and a memory unit 1306.

The memory unit 1306 is a recording device such as a hard disk, and stores programs and data that are used by the synthetic speech text-input devices 1a to 1e to embody respective functions. Stored as such a program are, for example, a video display program, a text amount calculation program, a linguistic analysis program, a prosody generation program, a waveform generation program, and a speech-video synchronization program.

The text amount calculation program is an exemplary program for causing a computer to execute the operations of the above-described input unit, text amount calculation unit, and text amount output unit. The linguistic analysis program, the prosody generation program, and the waveform generation program are exemplary programs that cause the computer to function as a speech synthesis unit. The CPU 1301 has each program loaded therein and executes an operation in accordance with each program, whereby the computer functions as a synthetic speech text-input device. These programs and recording media that record such programs are also included in embodiments of the present invention. The recording media dose not cover transitory propagating signals per se. It should be noted that when a slide editing system is constructed, for example, a slide display program, a speech-pasting program for embodying the function of the aforementioned slide-speech association unit 802 and other functions, etc., may be recorded in a recording unit. Further, the memory unit 1306 may be used also for the purpose of storing video material data and audio material data before being edited, video contents product data after being edited, slide material data, and the like.

Embodiments 1 to 6 are depicted with reference to exemplary cases where the synthetic speech text-input device is used for inputting a synthetic speech text in a video editing operation or a slide editing operation, but the use of the synthetic speech text-input device is not limited to those described above. The synthetic speech text-input device may be used for inputting other synthetic speeches, read-aloud speech texts, and the like.

It should be noted that each of the synthetic speech text-input devices according to Embodiments 1 to 6 can be used as a part of a speech synthesis device, a video editing device, or a slide editing device. Therefore, a speech synthesis device, a video editing device, and a slide editing device that include functions of the synthetic speech text-input device of any of the aforementioned embodiments are also included in embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A synthetic speech text-input device, comprising:
    an input unit that receives a set duration in which a speech to be synthesized is to be fit, and a text for a synthetic speech;
    a text amount calculation unit that calculates an acceptable input text amount based on the set duration received by the input unit, the acceptable input text amount being an amount of an input text acceptable as a synthetic speech of the set duration; and
    a text amount output unit that outputs the acceptable input text amount calculated by the text amount calculation unit, when the input unit receives the text for a synthetic speech.

2. The synthetic speech text-input device according to claim 1,
    wherein the input unit further receives an utterance speed of the synthetic speech, and
    the text amount calculation unit calculates the acceptable input text amount, further based on the utterance speed received by the input unit.

3. The synthetic speech text-input device according to claim 1, further comprising a speech synthesis unit that converts the text received by the input unit into a synthetic speech,
    wherein the speech synthesis unit calculates a duration of a partial synthetic speech corresponding a text portion received already by the input unit, and
    the text amount calculation unit corrects the acceptable input text amount, using the duration of the partial synthetic speech calculated by the speech synthesis unit.

4. The synthetic speech text-input device according to claim 1, further comprising a speech synthesis unit that converts the text received by the input unit into a synthetic speech
    wherein the speech synthesis includes:
    a linguistic processing section that analyzes the text received by the input unit, and generates an intermediate expression that includes reading information of the text;
    a prosody generation section that generates a duration of a synthetic speech corresponding to the text, and a pitch pattern as a variation pattern of a pitch of the synthetic speech corresponding to the text, from the intermediate expression generated by the linguistic processing section; and
    a waveform generation section that generates a synthetic speech, based on the duration of the synthetic speech corresponding to the text and the pitch pattern as a variation pattern of a pitch of the synthetic speech corresponding to the text, the duration and the pitch pattern being generated by the prosody generation section,
    wherein the text amount calculation unit calculates the acceptable input text amount, further using the duration of the synthetic speech calculated by the prosody generation section of the speech synthesis unit.

5. The synthetic speech text-input device according to claim 1, further comprising:
    a speech synthesis unit that converts the text received by the input unit into a synthetic speech; and
    a calculation formula changing unit,
    wherein the speech synthesis unit generates partial reading information of a text portion received already by the input unit, and a duration of a partial synthetic speech corresponding the text portion, and
    the text amount calculation unit calculates the acceptable input text amount by substituting the set duration in a predetermined calculation formula,
    the calculation formula changing unit changes the calculation formula, based on at least either one of the partial reading information and the duration of the partial synthetic speech generated by the speech synthesis unit.

6. The synthetic speech text-input device according to claim 1,
    wherein the text amount calculation unit calculates an upper limit and a lower limit of the acceptable input text amount, and
    the text amount output unit outputs a range of the acceptable input text amount expressed with the upper limit and the lower limit calculated by the text amount calculation unit.

7. The synthetic speech text-input device according to claim 1, wherein the input unit receives, from a user, a designation of at least a part of sections of video data, and sets a duration corresponding to the designated section as the set duration.

8. The synthetic speech text-input device according to claim 1, further comprising a speech synthesis unit that converts the text received by the input unit into a synthetic speech,
    wherein the speech synthesis unit includes:
    a linguistic processing section that analyzes the text received by the input unit, and generates an intermediate expression that includes reading information of the text;
    a prosody generation section that generates a duration of a synthetic speech corresponding to the text, and a pitch pattern as a variation pattern of a pitch of the synthetic speech corresponding to the text, from the intermediate expression generated by the linguistic processing section;
    a waveform generation section that generates a synthetic speech, based on the duration of the synthetic speech corresponding to the text, and the pitch pattern as a variation pattern of a pitch of the synthetic speech corresponding to the text, the duration and the pitch pattern being generated by the prosody generation section; and a prosody correction unit that extends or shortens the duration of the synthetic speech generated by the prosody generation section, or extends or shortens a duration of a pause included in the synthetic speech, so that the duration of the synthetic speech approaches the set duration.

9. The synthetic speech text-input device according to claim 1, further comprising:

a speech synthesis unit that converts the text received by the input unit into a synthetic speech;

a video data input unit that inputs video data including a section that is to be synchronized with a synthetic speech of the text received by the input unit; and a video-speech synchronization unit that edits video data so that a duration of the synthetic speech obtained by conversion by the speech synthesis unit approaches the set duration.

10. A non-transitory computer-readable recording medium storing synthetic speech text-input program that allows a computer to execute:

input processing that receives a set duration in which a speech to be synthesized is to be fit, and a text for a synthetic speech;

text amount calculation processing that calculates an acceptable input text amount based on the set duration received by the input processing, the acceptable input text amount being an amount of an input text acceptable as a synthetic speech of the set duration; and text amount output processing that outputs the acceptable input text amount calculated by the text amount calculation processing, when the input processing receives the text.

* * * * *